US009887966B2

(12) United States Patent
Ross et al.

(10) Patent No.: US 9,887,966 B2
(45) Date of Patent: Feb. 6, 2018

(54) METHOD AND APPARATUS FOR MEDIATING COMMUNICATIONS

(71) Applicant: Veritape Ltd, Hertfordshire (GB)

(72) Inventors: Cameron Peter Sutherland Ross, Hertfordshire (GB); James Heath, Hove (GB); Thomas Edward Briden, Bedfordshire (GB)

(73) Assignee: Eckoh UK Ltd., Hemel Hempstead (GB)

( * ) Notice: Subject to any disclaimer, the term of this patent is extended or adjusted under 35 U.S.C. 154(b) by 715 days.

(21) Appl. No.: 14/366,457

(22) PCT Filed: Dec. 20, 2012

(86) PCT No.: PCT/GB2012/053206
§ 371 (c)(1),
(2) Date: Jun. 18, 2014

(87) PCT Pub. No.: WO2013/093474
PCT Pub. Date: Jun. 27, 2013

(65) Prior Publication Data
US 2014/0365372 A1 Dec. 11, 2014

(30) Foreign Application Priority Data
Dec. 21, 2011 (GB) .................................. 1122107.4

(51) Int. Cl.
*H04L 29/00* (2006.01)
*H04L 29/06* (2006.01)
(Continued)

(52) U.S. Cl.
CPC ........ *H04L 63/0428* (2013.01); *G06F 21/606* (2013.01); *G06F 21/6263* (2013.01);
(Continued)

(58) Field of Classification Search
CPC .. H04L 63/0428; H04L 63/0471; H04L 69/08
See application file for complete search history.

(56) References Cited

U.S. PATENT DOCUMENTS

| 2003/0014650 A1* | 1/2003 | Freed ...................... H04L 29/06 713/189 |
| 2005/0210249 A1* | 9/2005 | Lee .......................... G06F 21/10 713/168 |

(Continued)

FOREIGN PATENT DOCUMENTS

| CA | 2 467 988 A1 | 11/2005 |
| EP | 1 443 728 A2 | 8/2004 |

(Continued)

OTHER PUBLICATIONS

International Search Report for PCT/GB2012/053206, dated Jun. 5, 2013.

*Primary Examiner* — Ghazal Shehni
(74) *Attorney, Agent, or Firm* — Blank Rome LLP

(57) ABSTRACT

A method of mediating communications between a first computing device and a second computing device, by an intermediary computing device, comprising establishing a communications link to each of the first and second computing devices, receiving a first message from the first computing device, the content of the first message comprising information in a protected format, converting at least part of the information in the protected format to an unprotected format, and transmitting a second message to the second computing device, the content of the second message comprising at least part of the information in the unprotected format.

2 Claims, 14 Drawing Sheets

(51) Int. Cl.
   *G06F 21/60* (2013.01)
   *G06F 21/62* (2013.01)
   *G06Q 20/10* (2012.01)
   *G06Q 20/40* (2012.01)
   *H04M 3/51* (2006.01)
   *H04M 7/12* (2006.01)

(52) U.S. Cl.
   CPC ............ *G06Q 20/10* (2013.01); *G06Q 20/40* (2013.01); *H04L 63/0471* (2013.01); *H04M 3/5133* (2013.01); *G06F 2221/2115* (2013.01); *H04L 2463/102* (2013.01); *H04M 7/1295* (2013.01); *H04M 2203/6009* (2013.01); *H04M 2203/6027* (2013.01)

(56) References Cited

U.S. PATENT DOCUMENTS

2006/0004662 A1   1/2006   Nadalin et al.
2011/0154466 A1*  6/2011   Harper .................. G06F 21/335
                                                    726/9

FOREIGN PATENT DOCUMENTS

| EP | 2 394 388 A1 | 12/2011 |
| WO | WO-01/02935 A2 | 1/2001 |
| WO | WO-2008/128349 A1 | 10/2008 |
| WO | WO 2010/088757 A1 | 8/2010 |

* cited by examiner https://www.acquirer.com/submit/PAN=1234567890123456&CV2=123 — 205

METHOD AND APPARATUS FOR MEDIATING COMMUNICATIONS

FIELD OF THE INVENTION

The invention generally relates to mediating communications, particularly communications in which personal, confidential or otherwise sensitive information is transmitted.

BACKGROUND

Companies often collect, store or otherwise process information concerning individuals in order to provide services and products. Many countries have enacted laws that regulate how such information is to be treated or may be used. In addition, some industry bodies prescribe codes of conduct and standards with which their members must comply. One such industry body is the Payment Card Industry (PCI) Security Standards Council. It administers the Data Security Standard (DSS), a framework for the secure handling of cardholder data. Compliance with the PCI DSS can place a considerable burden on companies, especially those who conduct commercial transactions on behalf of customers using call centre operations. This is because, on the one hand, such call centre operations may require access to cardholder data, but, on the other hand, the PCI DSS compliance requirements apply to all system components that are included in, or connected to, the cardholder data environment (i.e. that part of the network which stores, processes or transmits cardholder data), including network components, servers and applications.

Furthermore, there is a growing demand or expectation among individuals for the ability to protect their personal or financial information when conducting commercial transactions online with banks or other service providers.

Methods and apparatus are therefore needed that improve the manner in which such personal, confidential or otherwise sensitive information is handled.

SUMMARY

One aspect of the invention provides a method of mediating communications between a first computing device and a second computing device, by an intermediary computing device, the method comprising establishing a communications link to each of the first and second computing devices; receiving a first message from the first computing device, the content of the first message comprising information in a protected format; converting at least part of the information in the protected format to an unprotected format; and transmitting a second message to the second computing device, the content of the second message comprising at least part of the information in the unprotected format.

By implementing an intermediary computing device, for example in the form of a physically separate computer from the first and second computing devices, that converts between protected and unprotected formats, the method allows information to be protected, thereby preventing storage and use of plain-text credit card numbers at the first computing device for example, while still enabling the second computing device to make use of the unprotected information, for example for a commercial transaction.

Depending on the location of the intermediary computing device, either or both of the protected and unprotected information may be transmitted over a local or wide area network. Hence, by way of example, the first, second and intermediary computing devices may be located at different locations, and may communicate over a network such as the Internet. Alternatively, the intermediary computing device may be located at the location of the first computing device. The computing devices may communicate over wired, wireless, or a combination thereof, links. At least the information in the unprotected format may be securely transmitted.

The second message may be a modified version of the first message.

In one embodiment, establishing the communications link to the first computing device includes receiving a connection request addressed to a domain name of the second computing device. In another embodiment, establishing the communications link to the first computing device includes receiving a connection request addressed to a universal resource locator of the intermediary computing device. In this way, the intermediary computing device can be incorporated into the process with a simple change to an IP lookup table. For example, the IP address of the second computing device can be substituted with that of the intermediary computing device, so that any communications from the first computing device which would normally be transmitted to the second computing device are instead transmitted via the intermediary computing device.

In one embodiment, establishing the communications link to the first computing device includes intercepting a connection request from the first computing device to the second computing device, using a set of one or more predefined communication rules. The intermediary computing device can therefore function as a packet filter, passing each packet through a set of rules, for example based on the contents of the IP and transport header fields of the packet. The rule set may support one or more of Port Filtering, IP address filtering, Domain Name filtering, and MAC address filtering.

In one embodiment, establishing the communications link to the first computing device includes identifying a connection request from the first computing device to the second computing device, among a plurality of connection requests to a plurality of computing devices that include the second computing device. Thus, where substantially all connection requests are transmitted to the intermediary computing device, connection requests to computing devices other than the second computing device may simply be forwarded to those computing devices.

In one embodiment, the method further comprises receiving an information request message from the second computing device, the information request message comprising an electronic document allowing for entry of information in an unprotected format; modifying the information request message to enable the electronic document to accept entry of information in a protected format; and transmitting the modified information request message to the first computing device; wherein the information content of the first message comprises the electronic document with the information in the protected format. By modifying the information request message, the intermediary computing device can ensure that it is suitable for the first computing device. The term electronic document includes editable electronic forms such as a Web page with one or more editable fields.

In one embodiment, modifying the information request message comprises modifying one or more data entry fields to accept entry of the information in the protected format. Thus, the manner in which a Web page is displayed or accepts data can be modified. For example, the information in the unprotected format (e.g. the 16-digit credit card PAN) may have a first data length and the information in the protected format (e.g. the encrypted version of the credit card 16-digit PAN) a second data length different from the first data length. Other examples include input of the information as at least one of an electronic token, encrypted information and obscured information. The information may be input automatically or manually, or a combination of both.

In one embodiment, the method further comprises transmitting an event message comprising computer readable code which, when executed by the first computing device, causes a user interface associated with the first computing device to display a virtual input device. The use of a virtual input device may prevent keyloggers and other spyware or malware from logging the information if it is being manually entered via the first computing device. The virtual input device may encrypt or otherwise protect the information as it is being entered.

In one embodiment, the method further comprises receiving input events from the virtual input device, the input events representing information in an unprotected format, wherein the content of the first message comprises dummy information, and wherein converting at least part of the information in the protected format to an unprotected format comprises replacing at least part of the dummy information with the corresponding information received via the virtual input device.

In one embodiment, the method further comprises blocking the transmission of at least part of the information to the second computing device. Thus, only information authorised by a company's security policy as allowable for transmission to the second computing device is passed to it. In one embodiment, blocking the transmission comprises determining whether or not the second computing device is approved to receive the information. This provides a "whitelist" of computing devices, thereby preventing a user of the first computing device from taking the information in the protected format and faking a transaction with a service provider using that information in the protected format.

In one embodiment, the method further comprises selecting the second computing device from among a plurality of computing devices. In one embodiment, the method further comprises transmitting at least part of the information in the unprotected format to a third computing device. In this way, where there is more than one computing device suitable (e.g. authorised) to accept the sensitive information, the intermediary device can make a selection. This selection may be based on a predetermined list, which may indicate an order in which the selection is to be made.

In one embodiment, the method further comprises receiving a plurality of first messages from one or more first computing devices; for each of the plurality of first messages, converting at least part of the information in the protected format to an unprotected format; and transmitting one or more second messages to the second computing device, the content of each second message comprising at least a part of the information in the unprotected format from each of said plurality of first messages. Thus, information originating from multiple first computing devices can be aggregated and transmitted to the second computing device. Furthermore, the 'batch' processing of information originating from the first computing device can also be implemented.

The protected format can take different forms.

In one embodiment, the protected format comprises an encrypted format and converting at least part of the information from the protected format to the unprotected format comprises decrypting the information. The encryption/decryption may be based on symmetric or asymmetric encryption techniques. Thus, the first and intermediary computing devices may share a symmetric key. Alternatively, the first computing device may use a public key of the intermediary computing device to encrypt the information, which the intermediary computing device can decrypt using its private key. Alternatively still, the first and intermediary computing devices may use a hybrid encryption technique that makes use of characteristics from both symmetric and asymmetric techniques. These will be familiar to the skilled person.

In another embodiment, the protected format comprises a digital token and converting at least part of the information from the protected format to the unprotected format comprises detokenizing the information. In one embodiment, detokenizing the information comprises establishing a communication link to a digital token provider; transmitting the received digital token to the digital token provider; and receiving the information in the unprotected format from the digital token provider.

In one embodiment, the protected format comprises an obscured format and converting at least part of the information from the protected format to the unprotected format comprises unobscuring the information.

One aspect of the invention provides a method of mediating communications between a first computing device and a second computing device, by an intermediary computing device, the method comprising receiving a first message from the second computing device, the content of the first message comprising information in an unprotected format; converting the information in the unprotected format to a protected format; establishing a communications link to the first computing device; and transmitting a second message to the first computing device, the content of the second message comprising at least part of the information in the protected format:

The method shields against unwanted information arriving at the first computing device from outside sources, including "planned" communications (e.g. website transactions containing credit card information) and "unplanned" communications (e.g. customers sending emails containing, say, credit card details, despite email not being recognised as a secure payment method).

In one embodiment, the method further comprises blocking the transmission of at least part of the information to the first computing device. The information that is blocked can be of a type that is predetermined.

In one embodiment, receiving the first message from the second computing device comprises intercepting the first message using a set of one or more predefined communication rules; and redirecting the intercepted first message to a processing engine of the intermediary computing device. In this embodiment, the intermediary device can function as an information 'firewall', protecting against sensitive information in an unprotected format from reaching the first computing device.

The unwanted information could comprise financial information such as credit card numbers or account details. Often, such numbers have a predetermined format (in which case they may be determined by using regular expressions (RegEx), Luhn algorithm checking, and so on), however in other cases the sensitive information may be identified heuristically by the intermediary computing device.

In one embodiment, the protected format comprises an encrypted format and converting the information from the unprotected format to the protected format comprises encrypting the information.

In one embodiment, the protected format comprises a digital token and converting the information from the unprotected format to the protected format comprises tokenizing the information.

In one embodiment, tokenizing the information comprises securely transmitting the information in the unprotected format to a digital token provider; and receiving a digital electronic token in response.

In one embodiment, the protected format comprises an obscured format and converting the information from the unprotected format to the protected format comprises obscuring the sensitive information.

In one aspect of the invention, there is provided a method of processing information, the method comprising receiving, by a peripheral device that is coupled to a computer terminal, information in an unprotected format, at least part of the information intended for a destination computing device; converting, by the peripheral device, the information into a protected format; outputting, by the peripheral device, the information in the protected format to an application that is running on the computer terminal; establishing, by the computer terminal, a communications link to an intermediary computing device; and transmitting, by the computer terminal, a message to the intermediary computing device, the message comprising at least part of the information in the protected format to an intermediary computing device, wherein the intermediary computing device is operable to convert the protected format to an unprotected format and to transmit at least part of the information in the unprotected format to the destination computing device.

By using a peripheral, information in an unprotected format is not handled by the computer terminal.

In one embodiment, establishing the communications link includes transmitting, to the intermediary computing device, a connection request addressed to a domain name of the second computing device. In another embodiment, establishing the communications link includes transmitting, to the intermediary computing device, a connection request addressed to a universal resource locator of the intermediary computing device. In this way, the information in the protected format is not transmitted directly to the intended second computing device, which may not be configured to process it in that format.

In one embodiment, the method further comprises receiving, by the computer terminal from the intermediary computing device, an information request message originating from the second computing device, the information request message comprising an electronic document allowing for entry of information in a protected format, wherein the application is operable to process the electronic document.

In one embodiment, the method further comprises receiving, by the computer terminal from the intermediary computing device, an event message comprising a virtual input device; and displaying, at a display coupled to the computer terminal, the virtual input device.

In one embodiment, the method further comprises transmitting, by the computer terminal to the intermediary computing device, input events from the virtual input device, the input events representing information in an unprotected format, wherein the information in the protected format comprises dummy information. Thus, if the virtual keyboard is truly virtual, it will simply be displayed as a picture/movie of a keyboard. The actual conversion (i.e. protection) of the information is performed by the computing device which serves the virtual input device. Therefore no information in the unprotected format flows through the computer terminal.

One aspect of the invention provides a method of processing signals of a telephonic communication by an audio modifier, the signals conveying sensitive and non-sensitive information, the sensitive information being for use in a transaction occurring between a first computing device and a second computing device via an intermediary computing device, the method comprising receiving the signals; monitoring the received signals to detect, in the signals, one or more instances of one or more predetermined characteristics that represent the sensitive information; determining an alphanumeric representation for each identified instance of the predetermined characteristics, the determined alphanumeric representations being in an unprotected format; processing the alphanumeric representations to obtain the alphanumeric representations in a protected format; outputting the alphanumeric representations in the unprotected format to the intermediary computing device; and outputting the alphanumeric representation in the protected format to the first computing device and the intermediary computing device.

The signal may be audio or VoIP signals carrying DTMF tones/packets that represent the sensitive information. Thus, when DTMF tones/packets are detected in the signal, the audio modifier modifies them as they pass through it, and replaces an incoming DTMF tone or VoIP signal packet with a (possibly different) outgoing tone/packet. This can generally be considered to be protecting the information, i.e. essentially generating a 'token' comprising the replaced DTMF tones or VOIP signal packets. Other ways of protecting the information have already been discussed and apply equally here. In this way, the information in unprotected format is not transmitted to the first computing device at all.

The audio modifier can output information directly to third-party applications running on the first computing device using IP communication for example. Alternatively, the audio modifier can output the information for the third-party applications running on the first computing device by means of a separate device coupled to the first computing device. The audio modifier may send the unprotected information (but in a secure manner like HTTPS) to the intermediary computing device. However, in one embodiment, the audio modifier resides at the intermediary computing device.

One aspect of the invention provides an apparatus for mediating communications between a first computing device and a second computing device, the apparatus comprising means for establishing a communications link to each of the first and second computing devices; means for receiving a first message from the first computing device, the content of the first message comprising information in a protected format; means for converting at least part of the information in the protected format to an unprotected format; and means for transmitting a second message to the second computing device, the content of the second message comprising at least part of the information in the unprotected format.

In one embodiment, the means for establishing the communications link is operable to receive a connection request from the first computing device addressed to a domain name of the second computing device.

In one embodiment, the means for establishing the communications link is operable to receive a connection request from the first computing device addressed to a universal resource locator of the intermediary computing device.

In one embodiment, the apparatus further comprises means for intercepting a connection request from the first computing device to the second computing device, using a set of one or more predefined communication rules.

In one embodiment, the means for establishing the communications link to the first computing device is operable to identify a connection request from the first computing device to the second computing device, among a plurality of connection requests to a plurality of computing devices that include the second computing device.

In one embodiment, the apparatus further comprises means for receiving an information request message from the second computing device, the information request message comprising an electronic document allowing for entry of information in an unprotected format; means for modifying the information request message to enable the electronic document to accept entry of information in a protected format; and means for transmitting the modified information request message to the first computing device; wherein the information content of the first message comprises the electronic document with the information in the protected format.

In one embodiment, the electronic document allows for automatic and/or user-assisted entry of information.

In one embodiment, the means for modifying the information request message is operable to modify one or more data entry fields to accept entry of the information in the protected format.

In one embodiment, the apparatus further comprises means for transmitting an event message comprising computer readable code which, when executed by the first computing device, causes a user interface associated with the first computing device to display a virtual input device.

In one embodiment, the apparatus further comprises means for receiving input events from the virtual input device, the input events representing information in an unprotected format, wherein the content of the first message comprises dummy information, and wherein the means for converting at least part of the information in the protected format to an unprotected format is operable to replace at least part of the dummy information with the corresponding information received via the virtual input device.

In one embodiment, the apparatus further comprises means for blocking the transmission of at least part of the information to the second computing device.

In one embodiment, the means for blocking the transmission is operable to determine whether or not the second computing device is approved to receive the information.

In one embodiment, the apparatus further comprises means for selecting the second computing device from among a plurality of computing devices.

In one embodiment, the apparatus further comprises means for transmitting at least part of the information in the unprotected format to a third computing device.

In one embodiment, the apparatus further comprises means for receiving a plurality of first messages from one or more first computing devices; means for converting at least part of the information in the protected format to an unprotected format for each of the plurality of first messages; and means for transmitting one or more second messages to the second computing device, the content of each second message comprising at least a part of the information in the unprotected format from each of said plurality of first messages.

In one embodiment, the protected format comprises an encrypted format and the means for converting at least part of the information from the protected format to the unprotected format is operable to decrypt the information.

In one embodiment, the protected format comprises a digital token and the means for converting at least part of the information from the protected format to the unprotected format is operable to detokenize the information.

In one embodiment, the means for detokenizing the information is operable to establish a communications link to a digital token provider; transmit the received digital token to the digital token provider; and receive the information in the unprotected format from the digital token provider.

In one embodiment, the protected format comprises an obscured format and the means for converting at least part of the information from the protected format to the unprotected format is operable to unobscure the information.

One aspect of the invention provides an apparatus for mediating communications between a first computing device and a second computing device, the apparatus comprising means for receiving a first message from the second computing device, the content of the first message comprising information in an unprotected format; means for converting the information in the unprotected format to a protected format; means for establishing a communications link to the first computing device; and means for transmitting a second message to the first computing device, the content of the second message comprising at least part of the information in the protected format.

In one embodiment, the apparatus further comprises means for blocking the transmission of at least part of the information to the first computing device.

In one embodiment, the means for receiving the first message from the second computing device is operable to intercept the first message using a set of one or more predefined communication rules; and redirect the intercepted first message to a processing engine of the intermediary computing device.

In one embodiment, the protected format comprises an encrypted format and the means for converting the information from the unprotected format to the protected format is operable to encrypt the information.

In one embodiment, the protected format comprises a digital token and the means for converting the information from the unprotected format to the protected format is operable to tokenize the information.

In one embodiment, the means to tokenize the information is operable to transmit the information in the unprotected format to a digital token provider; and receive a digital electronic token in response.

In one embodiment, the protected format comprises an obscured format and the means for converting the information from the unprotected format to the protected format is operable to obscure the information.

One aspect of the invention provides an apparatus for processing information, the apparatus comprising a computer terminal; a peripheral device coupled to the computer terminal; wherein the peripheral device comprises means for receiving information in an unprotected format, at least part of the information intended for a destination computing device, means for converting the information into a protected format, and means for outputting the information in the protected format to an application that is running on the computer terminal; and wherein the computer terminal comprises: means for establishing a communications link to an intermediary computing device, and means for transmitting a message to the intermediary computing device, the message comprising at least part of the information in the protected format to an intermediary computing device; wherein the intermediary computing device is operable to convert the protected format to an unprotected format and to transmit at least part of the information in the unprotected format to the destination computing device.

In one embodiment, the means for establishing a communications link is operable to establish the communications link to the intermediary computing device by transmitting a connection request addressed to a domain name of the second computing device.

In one embodiment, the means for establishing a communications link is operable to establish the communications link to the intermediary computing device by transmitting a connection request addressed to a universal resource locator of the intermediary computing device.

In one embodiment, the computer terminal further comprises means for receiving, from the intermediary computing device, an information request message originating from the second computing device, the information request message comprising an electronic document allowing for entry of information in a protected format, and wherein the application is operable to process the electronic document.

In one embodiment, the computer terminal further comprises means for receiving, from the intermediary computing device, an event message comprising a virtual input device for display at a display associated with the computer terminal.

In one embodiment, the computer terminal further comprises means for transmitting, to the intermediary computing device, input events from the virtual input device, the input events representing information in an unprotected format, wherein the information in the protected format comprises dummy information.

One aspect of the invention provides an audio modifier for processing signals of a telephonic communication, the signals conveying sensitive and non-sensitive information, the sensitive information being for use in a transaction occurring between a first computing device and a second computing device via an intermediary computing device, the audio modifier comprising means for receiving the signals; means for monitoring the received signals to detect, in the signals, one or more instances of one or more predetermined characteristics that represent the sensitive information; means for determining an alphanumeric representation for each identified instance of the predetermined characteristics, the determined alphanumeric representations being in an unprotected format; means for processing the alphanumeric representations to obtain the alphanumeric representations in a protected format; means for outputting the alphanumeric representations in the unprotected format to the intermediary computing device; and means for outputting the alphanumeric representation in the protected format to the first computing device and the intermediary computing device.

In one embodiment, the audio modifier resides at the intermediary computing device.

One aspect of the invention provides a system comprising the aforementioned apparatuses.

One aspect of the invention provides a method of conducting a commerce transaction, the method comprising transmitting a request from a service provider computing device to a user terminal via an intermediary computing device, the request being for payment information in respect of the commerce transaction; transmitting a message from the user terminal to the intermediary computing device, the content of the message including payment information in a protected format; converting the payment information in the protected format to an unprotected format at the intermediary device; securely transmitting at least part of the payment information in the unprotected format from the intermediary computing device to the service provider computing device; and authorising the commerce transaction at the service provider computing device using the received payment information.

In one embodiment, the user terminal comprises a call centre terminal.

In one embodiment, the payment information comprises debit or credit card information.

Embodiments can be in the form of a hardware implementation, a software implementation, or a mixture of both. Thus any of the 'means', 'components' and 'parts' defined herein can be implemented as code modules in different combination in a computer. Embodiments thus encompass a computer programme provided as a computer programme product on a carrier medium which can include a storage medium and a transient medium or signal. The computer programme can be stored on a storage medium such as a solid state memory, an optical disc, a magnetic disc, or tape device. The computer programme can be provided on a transient medium or signal in the form of an optical signal, acoustic signal, magnetic signal, radio frequency signal, or electrical signal such as a TCP/IP signal carrying code over the Internet. The computer programme product could be involved in the implementation of an embodiment, either as a complete set of computer executable instructions capable of configuring, on its own, the performance of one or more of the embodiments, or as a set of instructions engaging pre-existing operable software components on a computer, to cause the configuration of the computer in the desired manner. The computer program product may be directly executable, or may require local processing, such as decoding, decompression, or compilation, before it is in an executable condition.

The methods and apparatus can be readily utilised in call centre operations. However, it will be appreciated that the disclosure is applicable to other applications that process sensitive information.

BRIEF DESCRIPTION OF THE FIGURES

Further aspects, features and advantages of the invention will become apparent to the reader of the following description of specific embodiments of the invention, provided by way of example only, with reference to the accompanying drawings, in which.

DETAILED DESCRIPTION OF EMBODIMENTS

Figure 1:
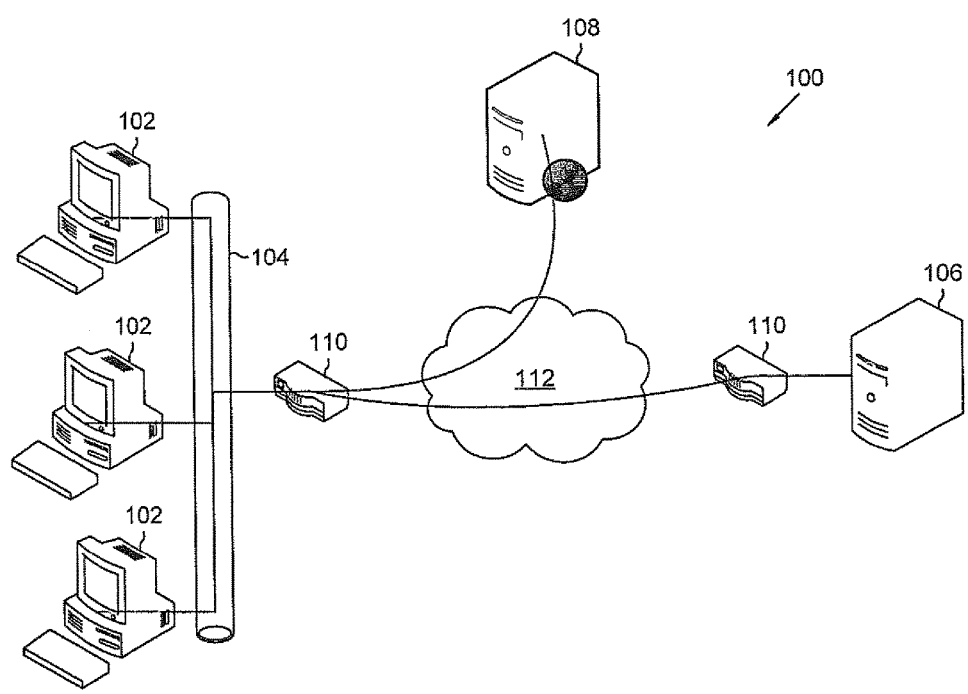
FIG. 1 schematically shows components of a system in a commercial transaction environment.

FIG. 1 schematically shows components of a system 100 in a commercial transaction environment.

In the system 100, computer terminals 102 of a call centre are connected to an internal network 104, such as an Ethernet network. Access to off-site computing facilities, such as web server 106 of a service provider (e.g. acquiring banks ('acquirers') or Payment Service Providers (PSPs)), as well as other servers 108, is provided via wide area network 112, such as the Internet, and by means of routing devices 110.

Figure 2A:
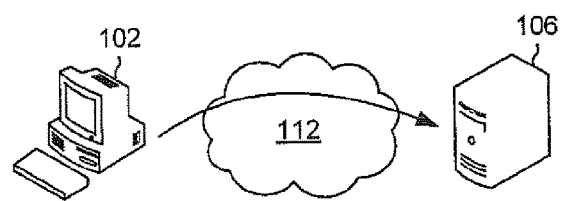
FIGS. 2a to 2d schematically show data flows and interactions between components of the system of FIG. 1 during a web based transaction.
Figure 2B:
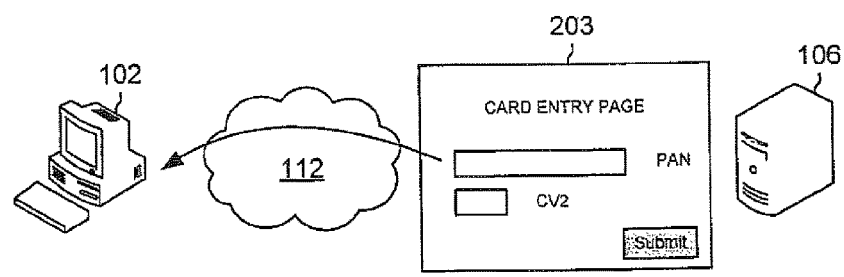
Figure 2C:
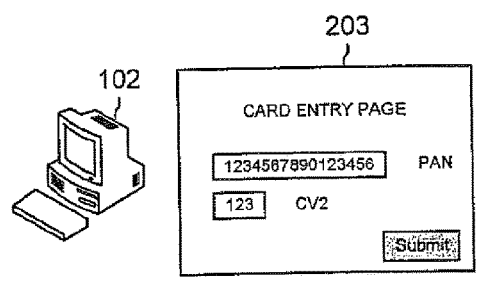
Figure 2D:
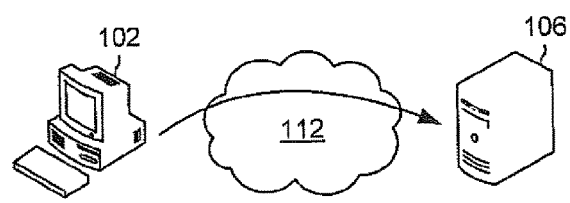

Referring now also to FIG. 2, which schematically shows exemplary data flows and interactions between components of system 100 during a web based transaction, when an order is received by a call centre agent, either over the phone, by fax, or on paper, the agent may access a website of the service provider using a web browser application on one of the computer terminals 102 (FIG. 2a). The web server 106 serves a payment page 203 to the requesting computer terminal 102, as is shown in FIG. 2b. The agent then proceeds to enter the customer's credit card data, for example the credit card PAN and CV2 numbers (FIG. 2c), as well as the order details such as the customer's name, address, order quantity, etc (not shown). The agent then 'submits' the data (FIG. 2d), with the browser sending a 'post' request 205 to web server 106, which authorises the payment and, in response, sends confirmation details to the computer terminal on a new web page (not shown). The call centre agent can then provide confirmation details to the customer's account, or read a confirmation number to the customer over the phone.

Figure 3A:
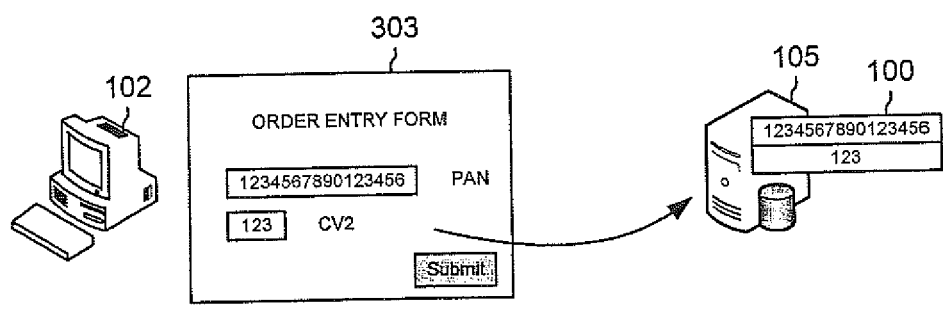
FIGS. 3a and 3b schematically show data flows and interactions between components of the system of FIG. 1 during an Enterprise Resource Planning (ERP) transaction.
Figure 3B:
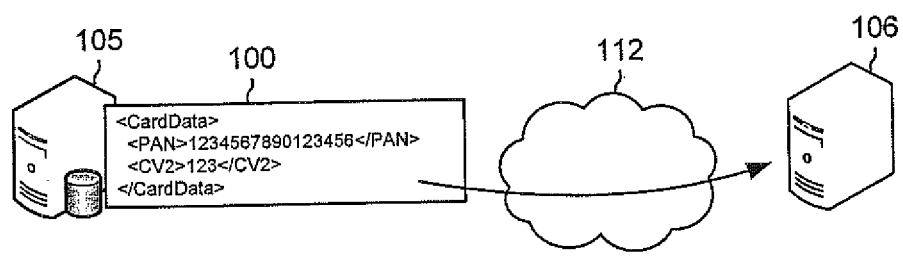

In addition to web based transactions, the system 100 of FIG. 1 may include an Enterprise Resource Planning (ERP) system or the like, which integrates all data and processes into a unified system. Of particular relevance to the present discussion is that in such systems the card data may reside in the ERP system from entry to dispatch. FIGS. 3a and 3b schematically show typical data flows and interactions. Here, an agent receives an order over the phone, fax or on paper, starts the ERP system 105 and creates new order. (The ERP system 105 may be located internally or externally, or a combination of both, of the call centre and is not shown in FIG. 1.) The agent types in the order details (name, address, order quantity, etc), and takes card data from customer over the phone (or from a fax/paper order). These are entered into a payment page 303. The agent 'submits' this information to the ERP system 105, as shown in FIG. 3a. The ERP system 105 processes the order, sending a request for build/dispatch. As noted above, the cardholder data may reside in the ERP system 105 until the order is dispatched. On dispatch, the ERP system sends a 'post' request to the service provider 106 (FIG. 3b). This is a browser-less transaction, working at the API level (or similar). The service provider 106 authorises the payment and sends confirmation details back to ERP system 105.

In the system 100 of FIG. 1, the cardholder data environment (the areas which cardholder data is stored, processed or transmitted) encompasses a large number of components of the system 100. Under the current PCI DSS requirements, customers need to deploy anti-virus tools, monitor wireless access ports, implement log file analysis and perform external penetration testing for their cardholder data environment. In addition, companies processing more than 6 million card payments annually are required to engage a Qualified Security Assessor (QSA) to perform a security audit of their cardholder data environment.

Two methods of protecting sensitive information where it is stored or transmitted are tokenisation and encryption. Both these approaches reduce the "scope" of storage. (In this context, "scope" is defined by the PCI DSS as systems which store, process and transmit cardholder data and connected systems.) They also limit the risks to loss of sensitive information, and the audit/compliance costs of ensuring the security of the stored sensitive information. In tokenisation, for example, service providers issue tokens, meaning that a company can submit card details once, and use a token for each subsequent transaction. However, this approach still requires the processing of unprotected card data on the company's site for the initial transaction, thus bringing the company into scope for PCI DSS requirements. Moreover, implementing tokenisation or encryption into existing systems can be technically complex. This is because many service providers do not accept tokens or encrypted card numbers as a valid transactional item; only the full credit card number (the PAN) and CV2 security check data are accepted during a transaction.

The system 100 of FIG. 1 also does not restrict sensitive information from unintentionally entering the system, i.e. does not analyse data to detect sensitive data being sent (or received) in violation of a company's security policies. So-called Data Loss Prevention (DLP) systems either log that sensitive information has been sent (without stopping the transmission), or stop the transmission entirely. This approach is inappropriate for customers who wish to allow the transmission but to protect/secure the data being sent or received so that it does not constitute a violation of their security policy, It is also inappropriate for companies wishing to allow an incoming transaction to continue, but to protect the sensitive data so it can be used inside the environment by authorised parties (for example in a medical environment where personal medical data needs to be stored but not used by hospital administrative staff, but it does need to be used by Doctors). In addition, DLP systems are typically complex to implement and monitor, and are often very costly.

In addition to the unintentional entry of sensitive information, companies may actively take customers' sensitive information from a source external to their business, store it internally and then transmit it externally at a later date. As an example, a company may wish to capture a customer's credit card details through a website, bring that card information into their internal order system, and then take a monthly credit card payment from the customer for a subscription service. As noted above, this approach still requires the processing of unprotected card data on the company's site for the initial transaction, thus bringing the customer into scope for PCI DSS requirements.

Figure 4:
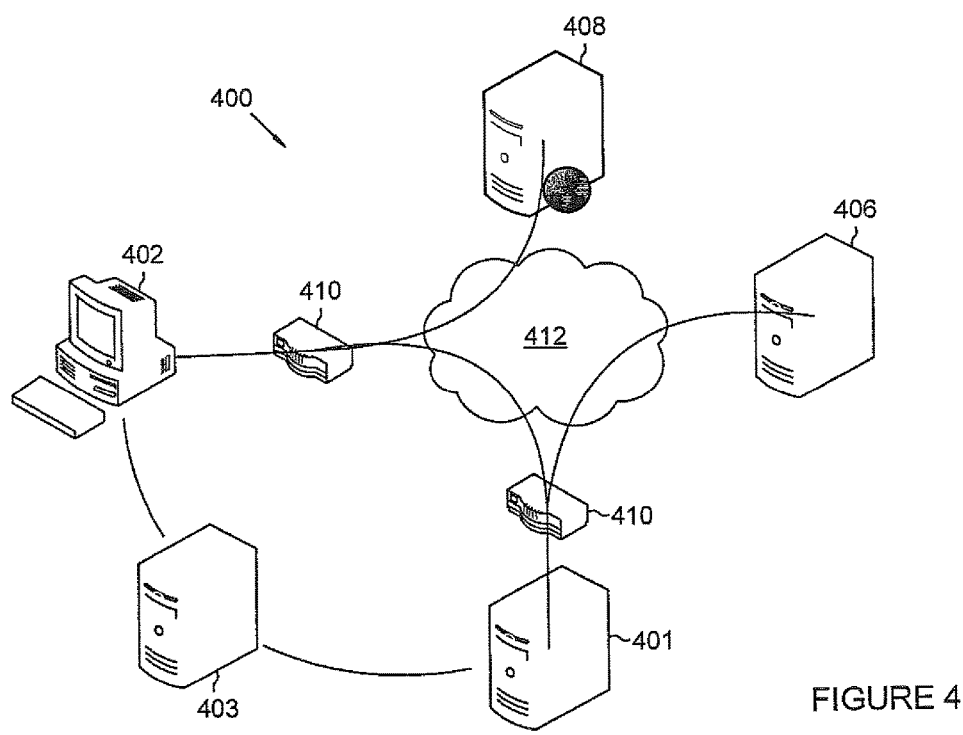
FIG. 4 schematically shows components of a system, according to an embodiment in which network traffic is selectively directed to an intermediary computing device.

FIG. 4 schematically shows components of a system, according to an embodiment in which network traffic is selectively directed to an intermediary computing device.

The system 400 of FIG. 4 includes computer terminals 402 (only one is shown) of a call centre connected to an internal network (not shown for clarity). Access to off-site computing facilities, such as web server 406 of a service provider, as well as other web servers 408, is once again provided via a wide area network 412, such as the Internet, and by means of routing devices 410. However, access to the web server 406 of the service provider is now facilitated via a proxy server 401. The proxy server is shown offsite, but can be onsite or offsite, with IP addresses of 192.168.1.99 or 10.0.0.1, respectively, for example. Also shown in FIG. 4 is a server 403 for dispensing digital tokens (and, in some cases, converting the digital tokens), accessible to both the computer terminal 402 and the proxy server 401 via the wide area network 412 (but for clarity the communication path is shown separate therefrom).

Suppose that web server 406 with domain name "www.acquirer.com" is at IP address 1.2.3.4 and that the proxy server 401 ("www.proxy.com") is at IP address 10.0.0.1. This time, when the call centre agent goes to "www.acquirer.com" in a browser, a connection from the computer terminal 402 is established (as will be discussed below) to the proxy server 401 rather than the web server 406, using for example Hypertext Transfer Protocol Secure (HTTPS) so that communications are fully encrypted. In one embodiment, the domain name "www.proxy.com" has a Secure Socket Layer (SSL) certificate generated using the domain name "www.acquirer.com". This could be an X.509 self-signed SSL certificate (.crt file) in the name of "www.acquirer.com" for example (X.509 is a standard for a Public Key Infrastructure (PKI) and Privilege Management Infrastructure (PMI) of the International Telecommunication Union (ITU) Telecommunication Standardization Sector). The generated .crt certificate is loaded onto the proxy server 401 at IP address 10.0.0.1.

Any browser connection to "www.proxy.com" will therefore see a valid SSL certificate, and determine that the requested Universal Resource Locator (URL), i.e. "www.proxy.com", matches the certificate domain. However, since the proxy server 401 may be an untrusted certificate issuer, the call centre may add the served certificate of proxy server 401 to a trusted list. Thus, the call centre may configure all computer terminals 402 which would normally connect to "www.acquirer.com" to accept a trusted certificate served by proxy server 401, either by individually browsing to "www.acquirer.com" and then accepting the .crt certificate as a trusted certificate, or mass deploying the .crt certificate to all relevant computer terminals 402 in the call centre. Then, either the internal DNS server of the call centre is changed so communications addressed to "www.acquirer.com" are routed to 10.0.0.1, or a local host file is deployed to relevant computer terminals 402 so that communications addressed to "www.acquirer.com" (service provider 406) are instead routed to the proxy server 401 at 10.0.0.1.

Figure 7:
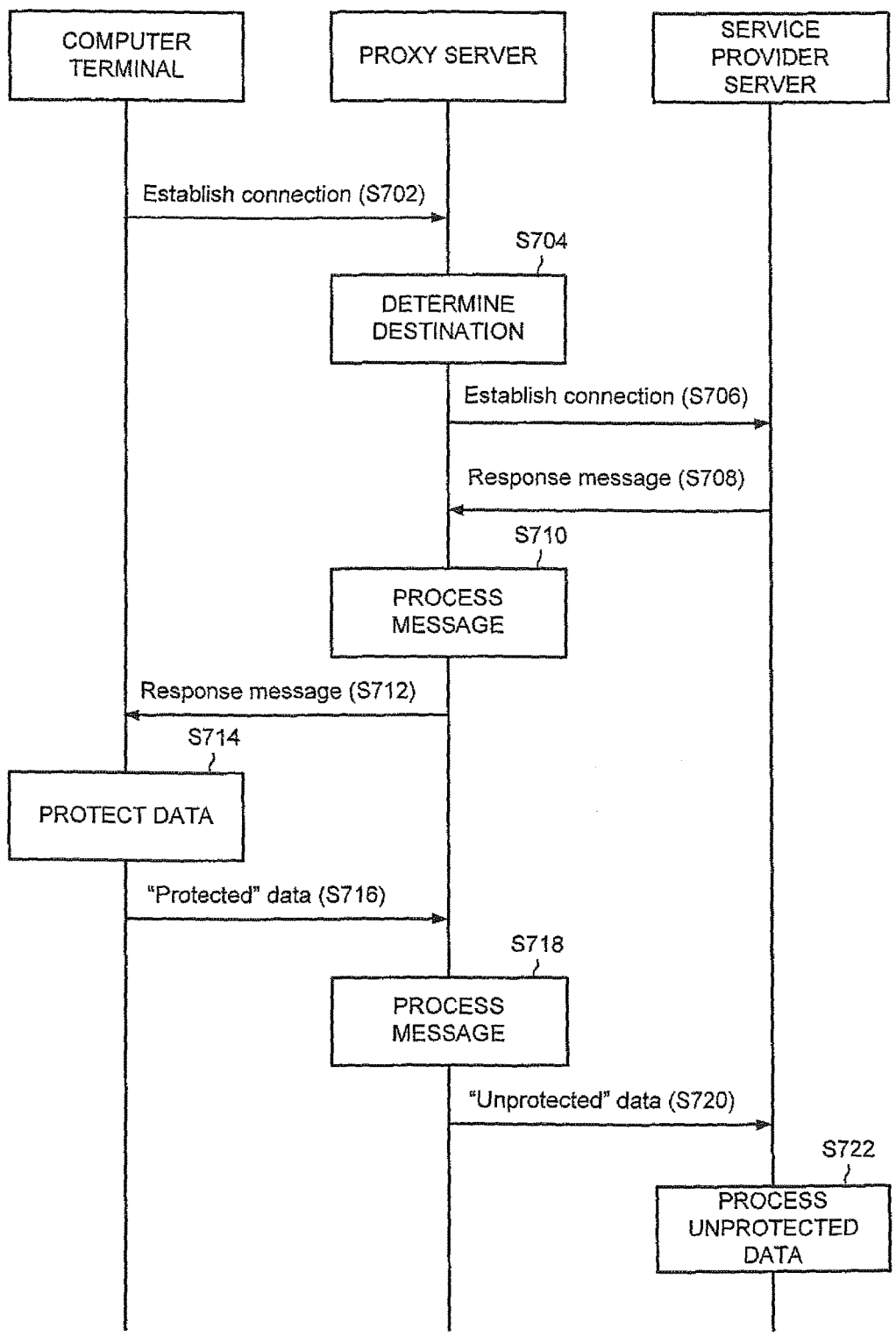
FIG. 7 is a sequence diagram showing data flows and interactions between components of a system, according to an embodiment.

In this way, and with reference also to FIG. 7, when computer terminal 402 requests a secure connection to "www.acquirer.com", the connection request is routed to 10.0.0.1 (i.e. proxy server 401). The computer terminal 402 checks the SSL certificate of the proxy server 401. Since this certificate has been marked as 'trusted', the SSL connection is established between computer terminal 402 and the proxy server 401 (S702). When the connection request is received by the proxy server 401, it checks the request for the host to which the computer terminal 402 is actually trying to connect, i.e. "www.acquirer.com", retrieves its IP address (1.2.3.4) from an external DNS and initiates a connection with "www.acquirer.com" (S704). The service provider system 406 provides this connection with its own HTTPS certificate. By way of example, proxy server 401 requests a secure connection to "www.acquirer.com." The local or external DNS routes the request to the IP address of "www.acquirer.com" (i.e. 1.2.3.4). Then, the proxy server 401 checks the SSL certificate of the service provider. If this certificate has been signed by a trusted certificate authority (CA) and matches the server URL, the SSL connection is established between 10.0.0.1 and acquirer (S706). At this point, everything which is received from the computer terminal 402 at the proxy server 401 can be echoed to the service provider server 406, and vice versa. Thus, 'cookies' and logins function as normal, but the proxy server 401 acts as a 'middle-man', and can see everything from both connections in plain text, for required manipulation.

Before proceeding with an explanation of the other processes shown in FIG. 7, further embodiments of implementing the system will be described.

In the embodiment that has just been described, the DNS points certain communications to the proxy server 401. In another embodiment, the URLs in use by the computer terminals 402 are changed. For all applications which normally would use the URL "www.acquirer.com", the call centre instead sets the URL to "acquirer.proxy.com." Similar to before, an X.509 SSL certificate (.crt file) in the name of acquirer.proxy.com is obtained from a trusted CA and loaded onto the proxy server 401. For computer terminals 402 which access "www.acquirer.com", the URL is changed to "acquirer.proxy.com". Thus, when the computer terminal 402 requests a secure connection to "acquirer.proxy.com", it checks the SSL certificate of proxy server 401. As this certificate has been issued by a trusted CA and matches the server URL, an SSL connection is established between computer terminals 402 and proxy server 401 (S702), with no warnings or error messages displayed to the user. In this embodiment, there are no changes required to the certificates accepted by the computer terminals 402, as the URL "acquirer.proxy.com" with which it is communicating actually matches the URL on the certificate. The proxy server 401 now modifies all requests to "acquirer.proxy.com", so that traffic is forwarded to "www.acquirer.com" (S704). In order to establish a secure connection to the service provider server 406, the proxy server 401 requests a secure connection to "www.acquirer.com". A local or external DNS routes this request to the IP address of the service provider server 406 (e.g. 1.2.3.4). The proxy server 401 checks the SSL certificate of "www.acquirer.com", and if this certificate has been signed by a trusted CA and matches the server URL, a SSL connection can be established between the proxy server 401 and server 406 (S706). Messages can again be sent from "www.acquirer.com" to the computer terminal 402 via the proxy server 401, but this time all occurrences of the text "www.acquirer.com" contained in the communication from "www.acquirer.com" are modified to "acquirer.proxy.com", so that the browser/ERP system doesn't then switch to "www.acquirer.com" and bypass the proxy for a future communication (since in this embodiment the call centres have not changed the DNS).

Figure 5:
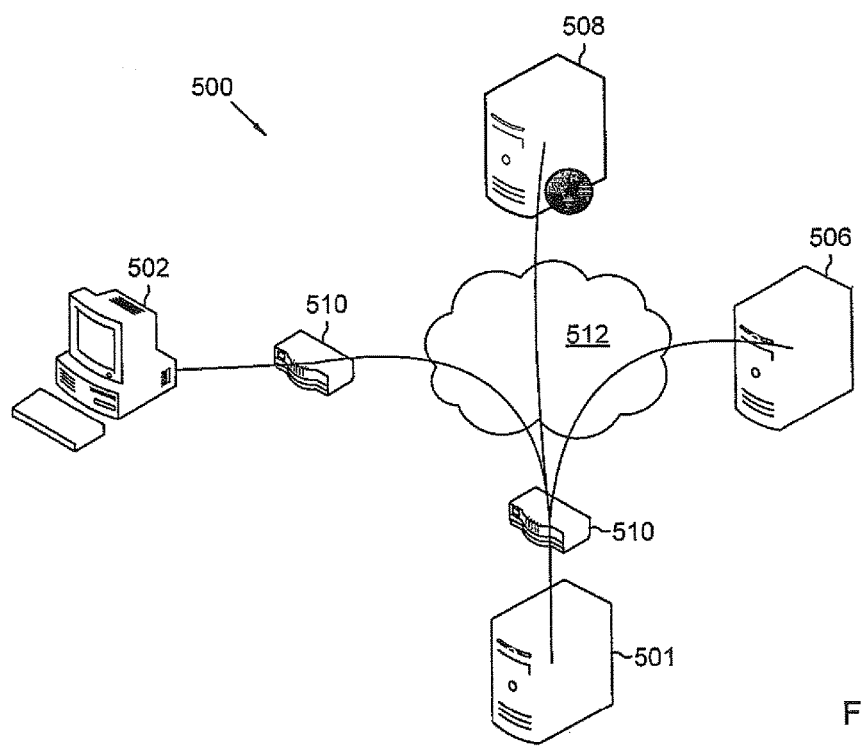
FIG. 5 schematically shows components of a system, according to an embodiment in which substantially all network traffic is directed to an intermediary computing device.

In one embodiment, shown in FIG. 5, substantially all connection requests from the computer terminals 502 are rerouted through the proxy server 501. In particular, access to both web server 508 and service provider server 506 is facilitated through proxy server 501, via a wide area network 512, such as the Internet and routing devices 510. The proxy server can be onsite or offsite, with IP addresses of 192.168.1.99 or 10.0.0.1, respectively, for example. The call centre configures all internet communications to be routed through the proxy server 501. In this embodiment, an X.509 self-signed SSL certificate (.crt file) is generated in the name of "www.acquirer.com", which is loaded onto the proxy server 501. The .crt certificate is added as a trusted certificate at the relevant computer terminals 502, either by individually browsing to "www.acquirer.com" and then accepting the .crt certificate as a trusted certificate, or mass deploying the .crt certificate to all relevant computer terminals 502 in the call centre. When computer terminal 502 requests a secure connection to "www.acquirer.com", this request (along with substantially all other connection requests) is routed to the proxy server 501. The proxy server 501 intercepts the HTTPS connection request, by 'sniffing' for packets going to "www.acquirer.com", and this is routed to a local IP address of the proxy server 501 (e.g. 127.0.0.1). Thus, in this embodiment the determination of the destination (S704) may be performed before the connection is established. The computer terminal 502 checks the SSL certificate of the proxy server. This certificate has been marked as 'trusted' and SSL connection is established between computer terminal 502 and proxy server 501 (S702). Intercepted packets are redirected internally to a local IP address such as 127.0.0.1, while all other traffic is sent to its intended destination in the manner of a conventional proxy server. The proxy server 501 at 127.0.0.1 hosts a proxy application which then creates the connection to service provider server 506. For example, when the proxy server 501 requests secure connection to service provider server 506, a local or external DNS routes this request to the IP address of the service provider server 506 (e.g. 1.2.3.4). The proxy server checks the SSL certificate at "www.acquirer.com". This certificate has been signed by a trusted certificate authority (CA), and matches the server URL, and SSL connection is established between 10.0.0.1 and the service provider server 506 (S706). In this embodiment, the change to the call centre IT infrastructure comprises routing all internet traffic via the proxy server's IP address 192.168.1.99 or 10.0.0.1. In other words, web addresses and DNS settings are unchanged. If the proxy server 501 is hosted within the call centre, this approach doesn't necessarily eliminate card holder data from the call centre environment. However, it does significantly reduce the cardholder data environment without introducing a remote party into the card processing process.

Figure 6:
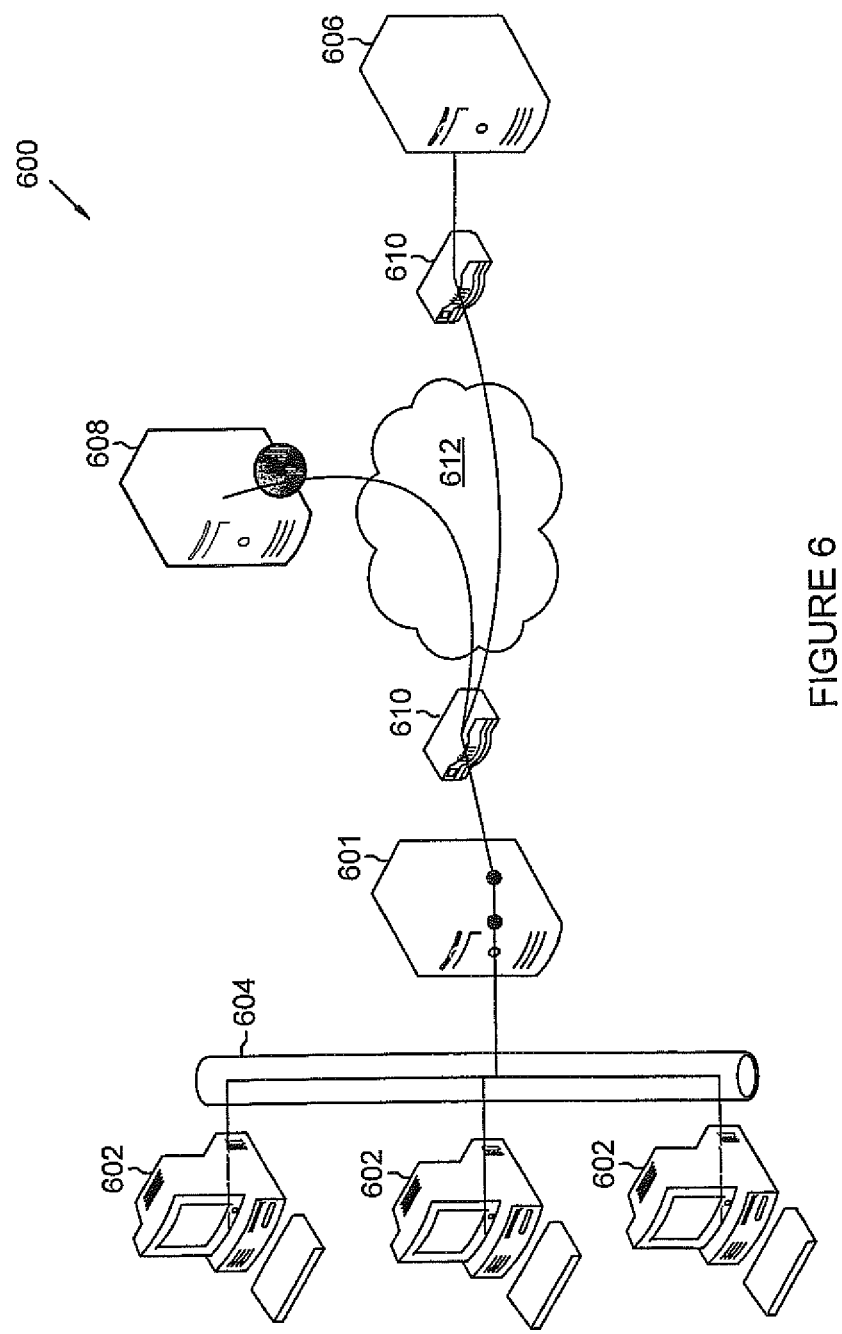
FIG. 6 schematically shows components of a system, according to an embodiment in which an intermediary computing device serves as a network traffic filter.

In one embodiment, shown in FIG. 6, the proxy server 601 comprises a packet filter, for example inserted on the call centre's outgoing internet communications. In one embodiment, the packet filter 601 has two separate LAN ports (represented by the solid circles), which are bridged internally. When the computer terminal 602 requests a secure connection to "www.acquirer.com", the connection request is intercepted by the packet filter 601, by sniffing for packets going to that destination (S704). These packets are redirected to 127.0.0.1, which hosts a proxy application. The proxy application then spoofs the IP address of the computer terminal 602 and requests a secure connection to the service provider server 606, which is routed via a local or external DNS to the IP address of the service provider server 606 (e.g. 1.2.3.4) (S706). All devices which would normally connect to the service provider server 606 are configured to accept a certificate generated by the packet filter. Similar to before, an X.509 self-signed SSL certificate (.crt file) can be generated in the name of "www.acquirer.com". This is loaded onto the packet filter. Once again, the .crt certificate can be added as a trusted certificate at the relevant computer terminals 602, either by individually browsing to "www.acquirer.com" and then accepting the .crt certificate as a trusted certificate, or mass deploying the .crt certificate to all relevant computer terminals 602 in the call centre. (In other cases, the proxy server's root certificate may be added to the trusted store so that any certificate generated by the proxy server is trusted. This is because the proxy server may actually be intercepting all HTTPS connections rather than just those to "www.acquirer.com" and so would need to generate certificates for those other sites as well.) Thus, when the computer terminal 602 checks the SSL certificate on the packet filter, since this certificate has been marked as 'trusted', the SSL connection is established between computer terminal 602 and packet filter 601. The packet filter then checks the SSL certificate of the service provider server 606, and if this certificate has been signed by a trusted CA and matches the server URL, an SSL connection can be established between the packet filter and the service provider server 606. Unlike the onsite proxy server 501 of the previous embodiment, the packet filter does not have an IP address per se, so that, if additional network connectors such as LAN cables are not attached to the packet filter, it cannot be addressed by any device inside or outside the call centre site. This prevents the packet filter from being accessed, modified or controlled. No changes are necessary for the call centre's DNS or web addresses.

The foregoing description has provided examples of how a connection between the client terminals and the service provider can be established, via an intermediary computing device. The discussion now turns to the types of messages and information that can be conveyed between the service provider server and the computer terminals.

Returning to FIG. 7, in response to establishing a connection request originating at the computer terminal, the service provider may send a response message (S708) to the computer terminal via the proxy server. At block S710, the proxy server processes the response message. The processing may include modifying the message. For example, as described with reference to FIG. 4, the proxy server can modify all occurrences of the text "www.acquirer.com" to "acquirer.proxy.com" so that the proxy isn't bypassed for future requests. More generally, the message may be modified to change the function and/or properties of the message. For example, where the response message comprises an electronic document such as a web page, the proxy server may insert, replace, delete and/or otherwise manipulate the message to control what and/or how content is displayed. Thus, a payment page could be modified to accept the 16-digit PAN in a longer encrypted format. The modified response message is then sent to the computer terminal (S712). At block S714, the sensitive information is input and converted into a protected format. As will be explained in due course, the computer terminal may have a separate encoding device that is used to protect the sensitive information. In other cases, where a digital token provider is implemented, the computer terminal may request a digital token and insert the received digital token. The sensitive information in the protected format is then transmitted to the proxy server (S716). The sensitive information in the protected format may be securely transmitted to the proxy server. In other words, the sensitive information in the protected format may itself be encrypted, via HTTPS for example. At block S718, the message is processed by the proxy server. This includes converting the sensitive information in the protected format to the unprotected format. In the case where a digital token server is implemented, the proxy server may send the received digital token to the digital token server to obtain the unprotected sensitive information. At least a part of the sensitive information in the unprotected format is then transmitted to the service provider server (S720). When sending such information over a wide area network, it may be securely transmitted. At block S722, the sensitive information is then processed.

Figure 8A:
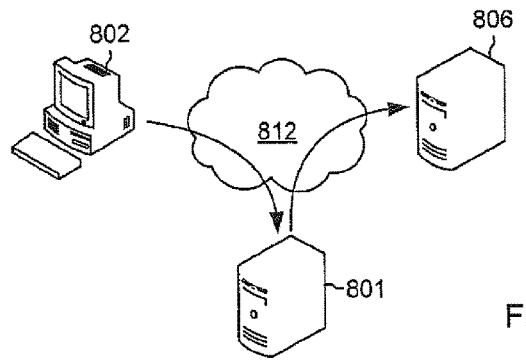
FIGS. 8a to 8c schematically show data flows and interactions between components of a system during a web based transaction, according to an embodiment.
Figure 8B:
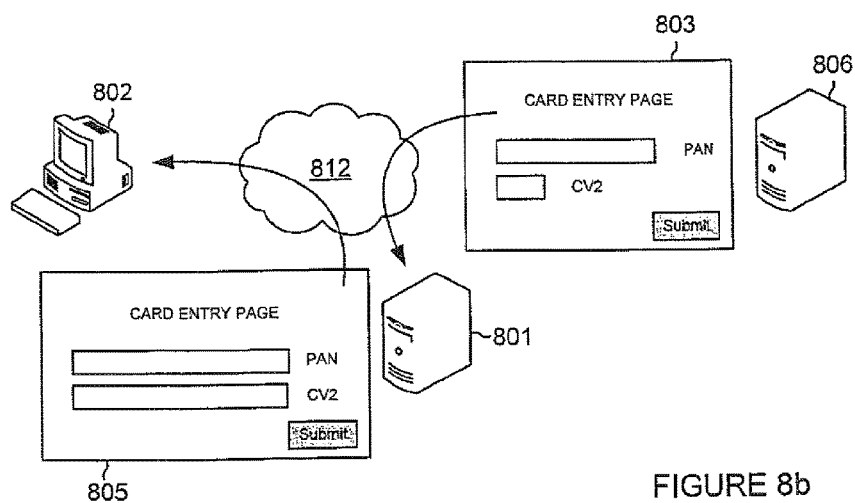
Figure 8C:
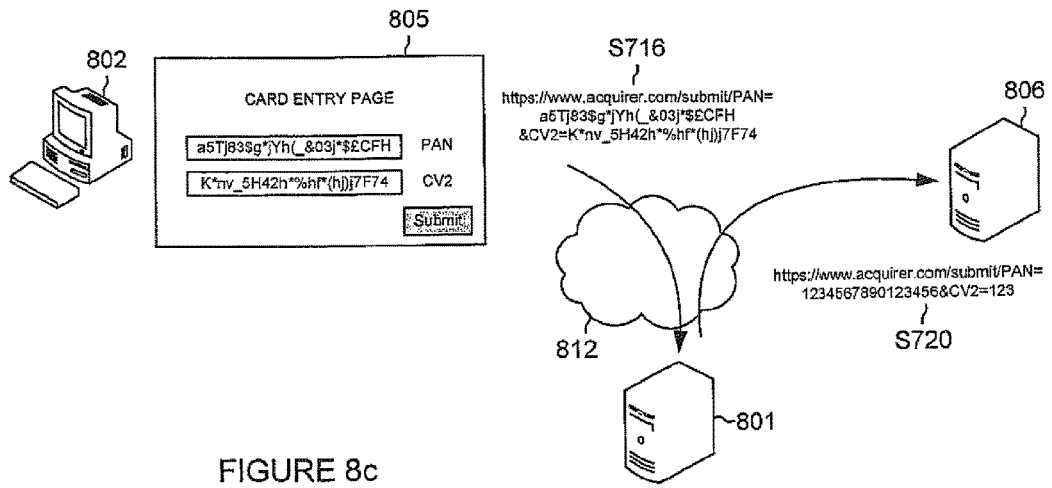

FIGS. 8a to 8c schematically show data flows and interactions between components of a system during a web based transaction, according to an embodiment. As before, an order could be received over the phone, by fax or on paper. The agent opens a browser and browses to "www.acquirer.com". As shown in FIG. 8a, a connection request for "www.acquirer.com" is sent from the agent's terminal 802 to the proxy server 801, because the IP lookup table has been altered (as previously described with reference to FIG. 4). The proxy server 801 examines the request from the agent. No key words/phrases/replacements are detected, so request is passed on unmodified to the service provider server 806.

As shown in FIG. 8b, the service provider server 806 serves a payment page 803 to the proxy server 801. Seeing that there is an html definition of a credit card number input field, the proxy server 801 changes the html code to allow for 128-character input (previously only 16 characters allowed). The proxy server 801 also modifies the 3-digit CV2 field to allow 128-char input. (Fields may also be modified to obscure the data on the screen, so that asterisks are shown instead of the underlying data.) The complete, modified page 805 is now transmitted to the computer terminal 802. If the order is being taken manually from paper, the agent can type in the card details using an encrypting numpad. If the order is being taken over the phone, the customer can enter their card details on their telephone keypad, and a decoder used to convert DTMF tones into encrypted keystrokes.

When the agent 'submits' the request information, the browser of the computer terminal 802 sends a 'post' request to "www.acquirer.com" (FIG. 8c).The proxy server 801 receives the 'post' request, and examines the request. Seeing encrypted card data, it decrypts and reassembles the 'post' request with unencrypted card data, before passing on to the server 806 of the service provider, which, in turn, authorises the payment and sends confirmation details back to the computer terminal 802 on a new web page (not shown). The agent may then confirm the details to a customer account, or read a confirmation number to the customer over the phone.

Figure 9A:
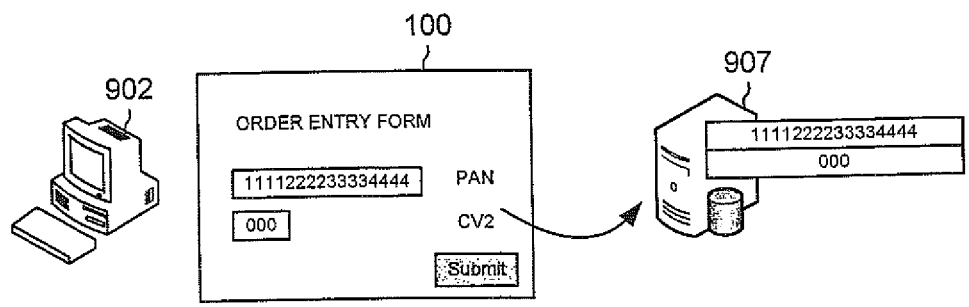
FIGS. 9a to 9c schematically show data flows and interactions between components of a system during an Enterprise Resource Planning (ERP) transaction, according to an embodiment.
Figure 9B:
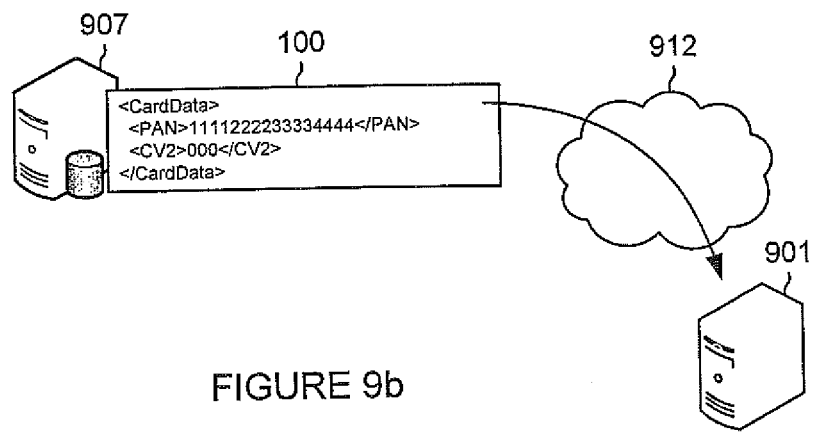
Figure 9C:
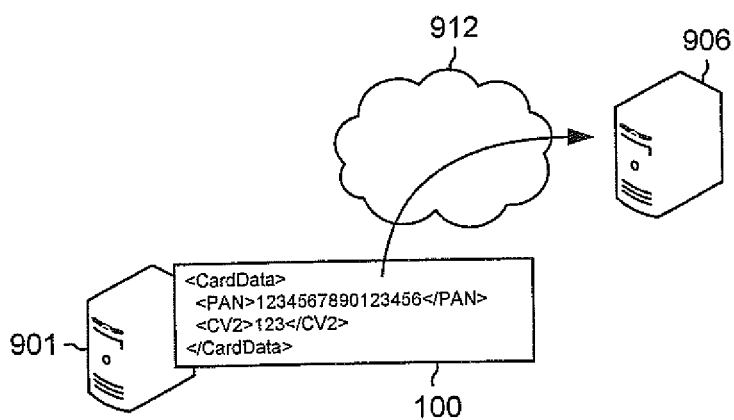

FIGS. 9a to 9c schematically show data flows and interactions between components of a system during an Enterprise Resource Planning (ERP) transaction, according to an embodiment. In this embodiment, the agent starts the CRM/ERP system and creates a new order by typing in the order details (name, address, order quantity, etc), and, if the order is being taken over the phone, asks the customer to type in the PAN using their phone keypad. A decoder at the agent computer terminal may be configured to detect DTMF tones, convert these to numeric values, and encrypt them. Alternatively, if the order is being taken manually from paper, the agent types in the PAN using an encrypting numpad. The same process occurs for the CV2. The encrypted card data is then sent to the proxy server or other server (not shown), which returns a token for the PAN (for example "1111222233334444"). The token is inserted into the PAN field automatically, and dummy CV2 data (for example "000") is inserted into the CV2 field. The token and dummy CV2 (not cardholder data) can be sent to the ERP system 907, where it is stored until the order is dispatched (FIG. 9a).

On dispatch, the ERP system 907 sends a 'post' request to the proxy server 901. This is a browser-less transaction, working at the API level (or similar). The token and dummy CV2 are sent in lieu of the card number and real CV2 (but note that no changes are required to the ERP system, as the token may have the same format as a credit card number). The proxy server de-tokenises the PAN, and retrieves the CV2 from a lookup table.

As shown in FIG. 9c, the real PAN and CV2 numbers are then replaced in the communication before forwarding to the service provider server 906, which authorises the payment and sends confirmation details back to www.proxy.com for forwarding back to customer (not shown). The proxy server then securely deletes its record of the CV2, as authorisation has been completed. Optionally, the PAN may be kept for future de-tokenising (e.g. for a refund or recurring subscription payment). The ERP process then continues as normal (invoicing, dispatch, etc).

Figure 10:
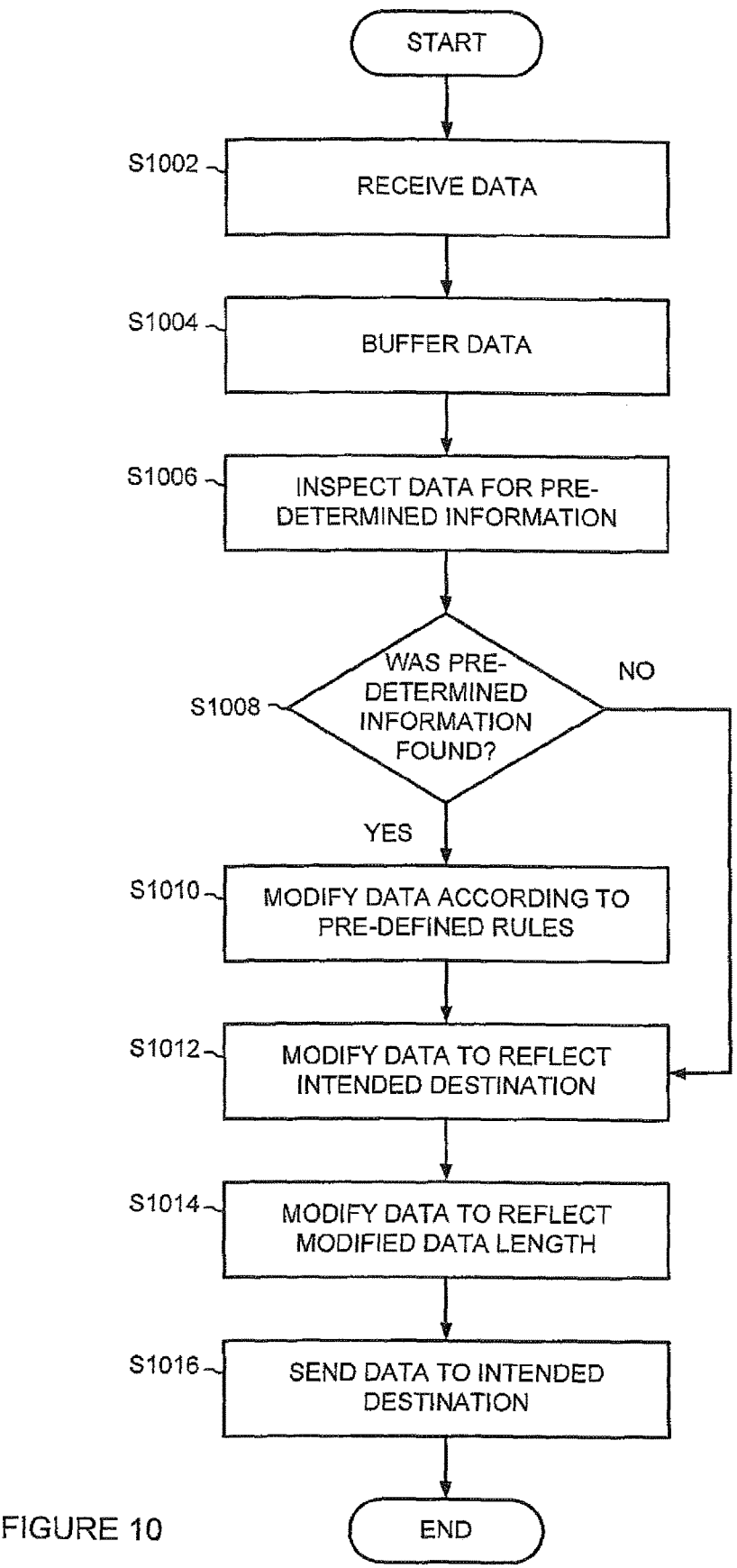
FIG. 10 is a flow diagram showing the message processing, according to an embodiment.

FIG. 10 is a flow diagram showing the message processing by the proxy server, according to an embodiment. This embodiment is presented in the context of the Transmission Control Protocol (TCP), but it will be appreciated that the general principles are applicable to other protocols, such as User Datagram Protocol (UDP) and Stream Control Transmission Protocol (SCTP). Certain processes are not shown in the interests of clarity.

As familiar to those skilled in the art, TCP accepts data from a data stream, segments it into chunks, and adds a TCP header creating a TCP segment. Block S1002 entails receiving a data segment. In the exemplary embodiment, the data segment comprises a TCP segment 'chunk'. At block S1004, received data segments are buffered by the proxy server. In this embodiment, the chunks of data are buffered until an entire TCP segment is received. At block S1006, the signals are inspected for predetermined information. For example, TCP data contains anything which is sent over TCP, and can include HTTP (standard webpage) (this has HTTP Headers and HTTP Data), HTTPS (encrypted webpage), and VPN (virtual private network traffic). This step can therefore include inspecting HTTP (e.g. HTTP 'POST' data), HTTPS or VPN. If the pre-determined information was found (block S1008), then at block S1010 the data is modified. In one embodiment, the data is turned from a "protected" format to an "unprotected" format, as will be discussed in more detail later. At block S1012, the data is modified to reflect the intended destination. For HTTP this can include modifying the HTTP Header, for example to change "acquirer.proxy.com" to "www.acquirer.com". At block S1014, the data is modified to reflect the modified data length. For HTTP, this can include modifying the HTTP Header length parameter to reflect the new HTTP DATA length based on all prior changes. At step S1016 the modified message is sent to the intended destination. It will be appreciated that there may be no need to 'chunk' the TCP DATA on sending, or to add a TCP HEADER to the information, as the sending protocol may handle this automatically.

Embodiments of apparatus for implementing aspects of the aforementioned methods will now be described.

Figure 11:
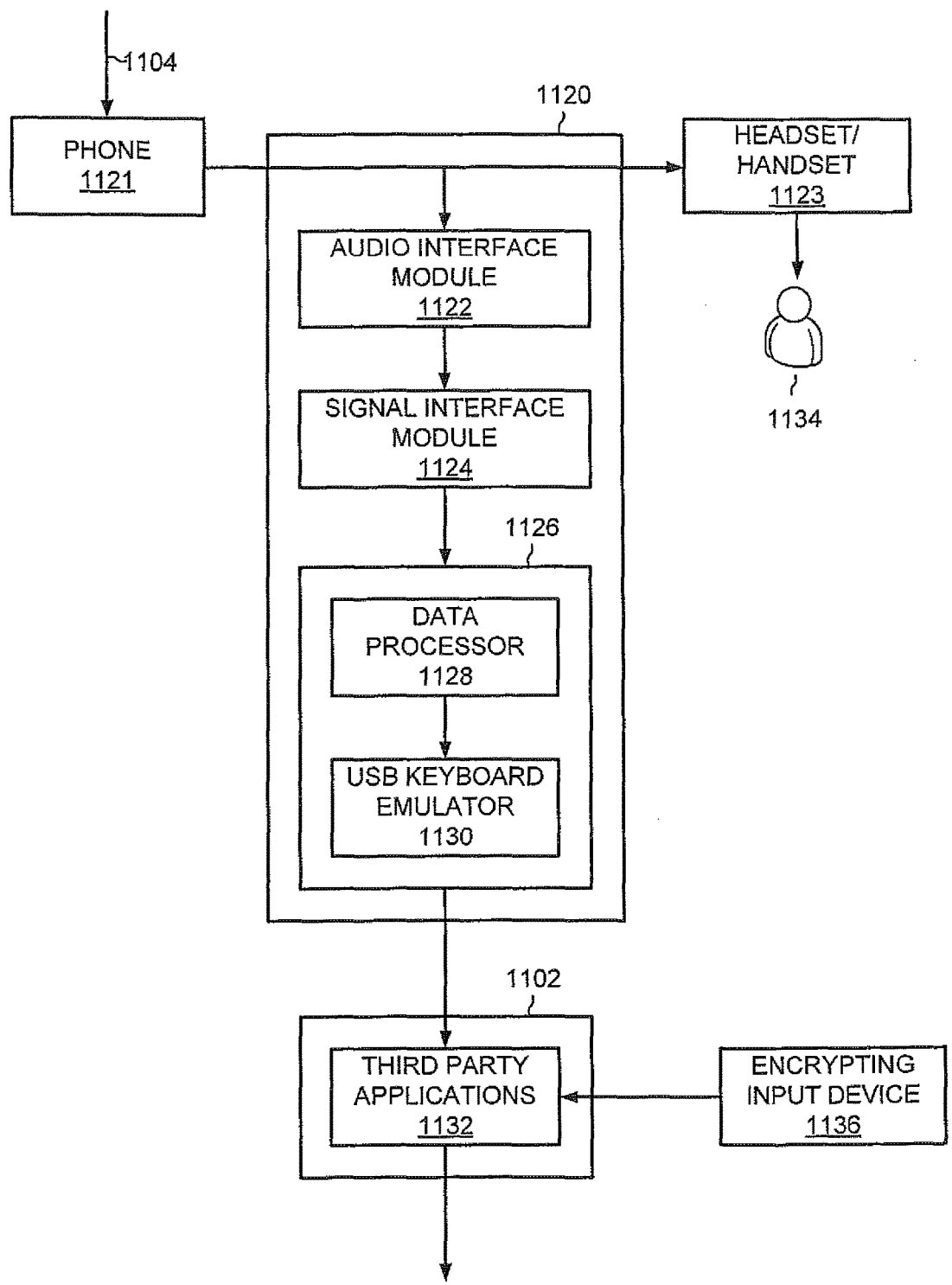
FIG. 11 schematically shows a peripheral device for processing information, according to an embodiment.

FIG. 11 schematically shows a call processor 1120 that may be implemented as a peripheral apparatus at the computer terminal 1102 of the agent, where information is either automatically extracted by peripheral apparatus 1120, or input manually by the agent, i.e. received by paper/fax, or verbally, and input manually using an encrypting input device 1136. In FIG. 11, input devices covering both options are shown, though it will be appreciated that this need not be the case.

The call processor 1120 comprises an audio interface module 1122 for receiving data signals, a signal decoder module 1124 for recognizing characteristic information, and a data entry interface module 1126 for inserting data into applications on a computer terminal of the agent.

An incoming call 1104 from a customer is switched to the phone 1121 of agent 1134 by a private branch exchange (PBX) (not shown) of the call centre. The received data signals may comprise mono or stereo analogue audio signals, mono or stereo digital audio signals, Voice over Internet Protocol (VoIP) data signals, mono or stereo packetized audio data, and the like.

The audio interface module 1122 converts the received data signals into standard digital audio for analysis, though it will be appreciated that such conversion is not always necessary. The methods that may be used by the audio interface module 1122 to convert the data signals include those familiar to those skilled in the art of audio processing, for example decompressing of standard audio codecs (e.g. G.711 μ-Law, G.711 a-Law, G.729 and GSM), removing header and other non-audio information from packetized data, and so on.

The digital audio is output to signal interface module 1124, which detects characteristic information in the digital audio. This characteristic information can include, but is not limited to, particular audio tones such as Dual Tone Multiple Frequency (DTMF) tones, voice patterns, and data packet identifiers of, for example, VoIP packets.

The characteristic information established by the signal interface module 1124 is output to the data entry interface module 1126, which determines information related to the characteristic information, for example a number or letter represented by a DTMF tone. The methods by which the signal monitoring module determines whether a predetermined pattern has been found in the digital audio include those familiar to those skilled in the art, such as Fast Fourier Transformations (FFT) and digital signal processing including Goertzel analysis. These processes are usually dependent on the nature of the predetermined pattern being searched for within the digital audio, and corresponding steps may need to be taken to ensure that the appropriate method is used for each type of predetermined pattern. Such aspects can be defined as configuration settings for the signal interface module.

The data entry interface module 1126 is configured to provide the information to a third-party application on the computer terminal 1102 of the agent. From the foregoing discussion, it will be appreciated that the third party application may already be configured to accept protected data, for example because the proxy server has modified the web page that is served to the computer terminal of the agent. This may include determining how the information is displayed within the third-party application or the operation of the third-party application, such that the information is displayed within the third-party application in a suitable format, or that the third-party application operates in a desired manner. Where the third-party application is already configured to display the information in a suitable format, or operate in the desired manner, the data output by the data entry interface module may be the same as the signals received from the signal interface module. In this way, the data interface module need not change the signals or their method of display within the third-party application, or the operation of the third-party application, and can simply pass them directly to the third-party application. The signals communicated by the signal interface module to the third-party application can be communicated via electronic communication, such as ActiveX communication, Internet Protocol communication, Application Programming Interface (API) communication, signals which mimic computer keystrokes, or any other electronic methods.

In one embodiment, the signal interface module 1124 is adapted to recognize DTMF tones, the signal interface module 1124 comprises a Dual Tone Multi-Frequency (DTMF) decoder module, and data entry interface module 1126 is a microcontroller comprising a data processor 1128 for processing the data signals (e.g. determining credit card numbers represented by the DTMF tones) and a USB keyboard emulator 1130 that mimics computer keystrokes. In this way, the DTMF tones can be directly 'inserted' into the applications without input from the agent 1134.

It will be understood that the functions of the modules may be performed in different combinations. For example, determining the information related to the characteristic information could be performed by the signal interface module 1124. Alternatively, all of the functions could be combined into a single module. Other combinations will be apparent to the skilled reader.

For the call processor 1120 described above, data is extracted automatically. However, as mentioned earlier, the information may also be input manually by the agent using a physical encrypting input device 1136, for example an encrypting keyboard/number pad or scanning device. Thus, the credit or debit card details are protected from the moment it is entered, for example keyed in by hand or gathered through a magnetic card reader, Point of Sale terminal or other device.

Figure 12:
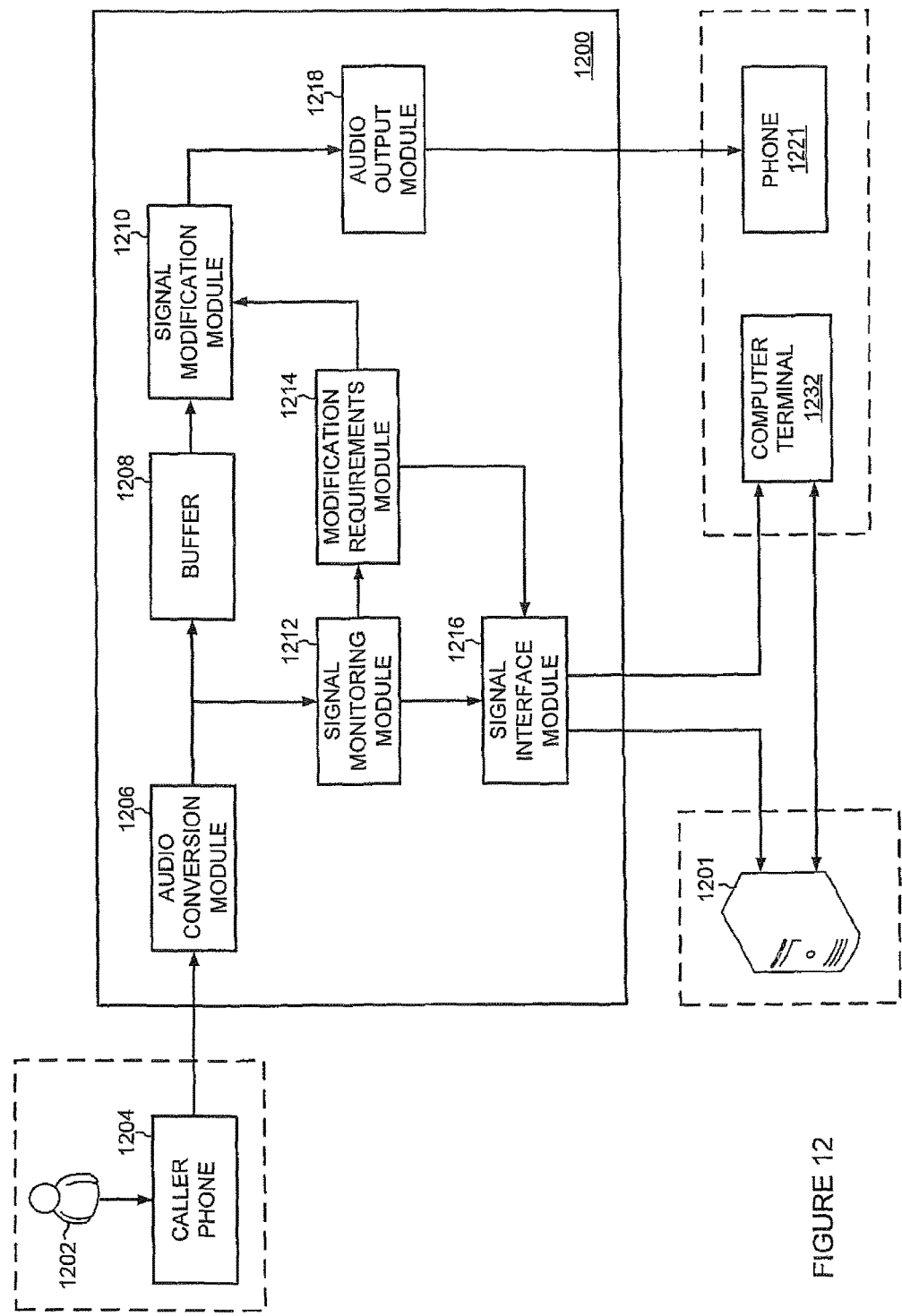
FIG. 12 schematically shows an audio modifier for processing information, according to an embodiment.

FIG. 12 schematically shows an embodiment in which a caller 1202 communicates sensitive and non-sensitive information using a phone 1204. The sensitive and non-sensitive information pass through an audio modifier 1200.

The audio modifier 1200 comprises an audio conversion module 1206, a buffer 1208, a signal modification module 1210, a signal monitoring module 1212, a modification requirements module 1214, a signal interface module 1216 and an audio output module 1218.

Figure 13:
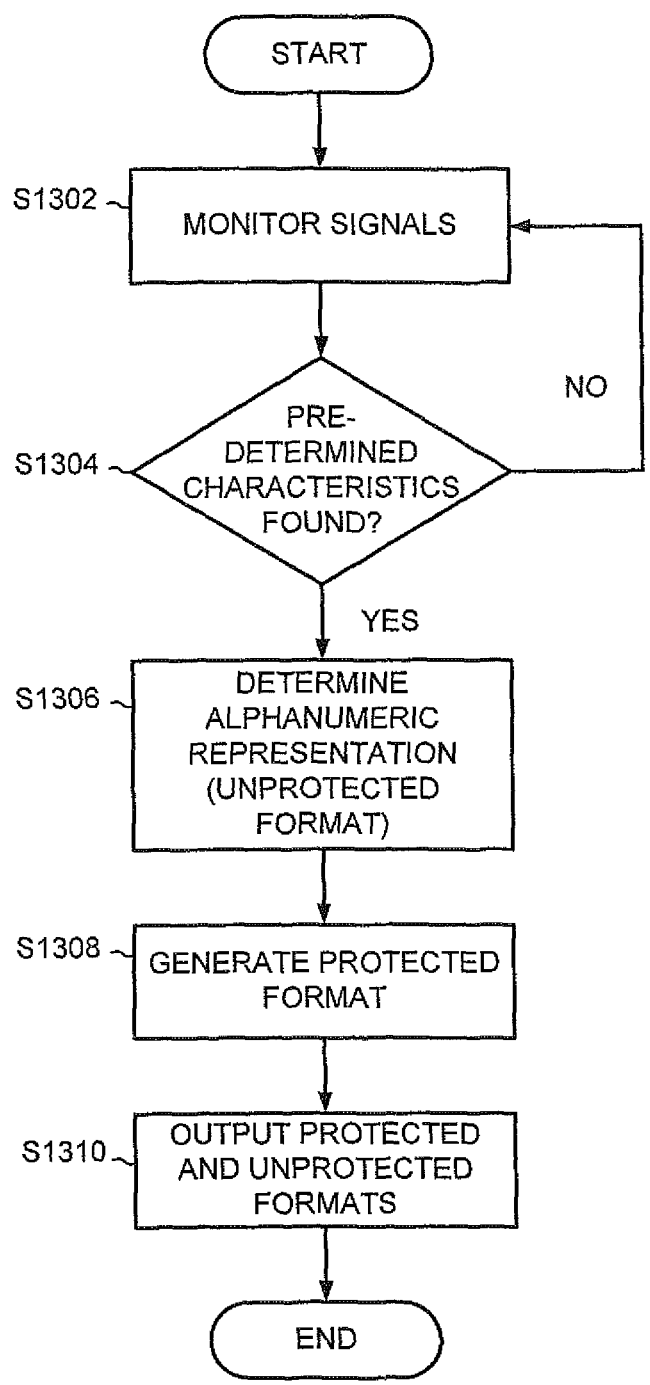
FIG. 13 is a flow diagram showing the processing by the audio modifier, according to an embodiment FIG. 14 schematically shows a client data processing apparatus, according to an embodiment.

A flow diagram showing the operation of the signal monitoring module 1212, the modification requirements module 1214, and the signal interface module 1216 is shown in FIG. 13 and will be referred to in the following discussion.

The audio modifier 1200 may be considered to be "always on" and autonomous, which is to say that it does not need to be switched between modes and can function independently. Here, the audio modifier module is shown connected to the phone 1221 of the call centre agent, but it will be appreciated that the audio modifier 1200 can be placed at any point between the caller 1202 and the phone 1221 of the call centre agent, or at other points not directly between the caller 1202 and the phone 1221 of the call centre agent.

In FIG. 12 the audio modifier module is shown separate from the proxy server 1201, but it will be appreciated that the audio modifier module may be contained within the proxy server.

The audio conversion module 1206 is configured to convert the incoming data representing audio into standard digital audio, for analysis. The methods used by the audio conversion module 1206 to convert the data signals include those familiar to those skilled in the art of audio processing, for example decompressing of standard audio codecs (e.g.

G.711 μ-Law, G.711 a-Law, G.729 and GSM), removing header and other non-audio information from packetized data, and so on.

The digital audio is output to buffer 1208 and signal monitoring module 1212.

The signal monitoring module 1212 is configured to detect characteristic information (predetermined patterns) in the digital audio, for example particular audio tones such as DTMF tones (block S1302). The signal monitoring module 1212 is also configured to determine information related to the characteristic information (block S1306), such as a number or letter represented by a DTMF tone, a time at which the pattern is detected within the digital audio signal, the duration of the tone (pattern), the number of DTMF tones detected, and so on.

The methods by which the signal monitoring module 1212 determines whether a predetermined pattern has been found in the digital audio (block S1304) include those familiar to those skilled in the art, such as Fast Fourier Transformations (FFT) and digital signal processing including Goertzel analysis. These processes are usually dependent on the nature of the predetermined pattern being searched for within the digital audio, and corresponding steps may need to be taken to ensure that the appropriate method is used for each type of predetermined pattern. Such aspects can be defined as configuration settings for the signal monitoring module 1212.

Timing information established by the signal monitoring module 1212 is output to a modification requirements module 1214 and the signal interface module 1216. Thus information such as the detected pattern's position within the digital audio can be used by the modification requirements module to determine how or when to modify the signal. In particular, the timing control signal can indicate a start time and a finish time for each tone, or start and finish times for a set of tones.

Other information on the nature of the predetermined pattern detected by the signal monitoring module 1212 is also output to the modification requirements module 1214 and the signal interface module 1216. Thus information such as the exact pattern detected or the number of occurrences of the detected pattern can be used by the modification requirements module 1214 to determine how or when to modify the signal.

The modification requirement module 1214 can also make reference to other information, such as algorithms, heuristics, statistical information regarding predetermined patterns previously detected within the current call or other calls, call status, and information from databases or other external data sources (not shown).

The modification requirement module 1214 outputs commands to the signal modification module 1210, dictating the modifications to be made to the signal. It also outputs data to the signal interface module 1216.

In one embodiment, the signal modification module 1210 replaces DTMF tones with other, possibly different, DTMF tones. In this manner, the audio modifier may act to convert a caller's credit card number into a token of the same length. It may also act to convert sensitive information into 'dummy' information, for example converting a caller's 3-digit CV2 into '000'. It may also act to convert sensitive information into a format-preserving encryption format, maintaining the length of the caller's credit card number, but encrypting it. In another embodiment, the signal modification module 1210 may insert additional DTMF tones into the signal. In this manner, the audio modifier may act to convert a caller's 16-digit credit card number into an encrypted format with a length greater than 16 digits. The aforementioned methods can generally be referred to as generating a protected format of the information (block S1308)

The data output by the modification requirements module 1214 to the signal interface module 1216 may include data related to the modification requirements passed to the signal modification module 1210. In this way, the signal interface module may be passed the token which acts as a substitute for the caller's credit card number.

The signal interface module 1216, having been provided data from both the signal monitoring module 1212 and the modification requirements module 1214 sends this data to the proxy server 1201 and any other relevant devices (block S1310).

In one embodiment, the signal interface module 1216 sends the caller's credit card number and the token representing the credit card number (this having been generated by the modification requirements module) to the proxy server 1201. In this way, when the caller's payment is eventually processed by the contact centre and the token passed from the agent's payment system to the proxy server 1201, the proxy server can replace the token with the caller's credit card number, prior to passing the transaction to the acquirer. In this case, the combination of the audio modifier 1200 and the proxy server 1201 can act to allow transactions to be processed by the call centre but without any of the caller's sensitive credit card data entering the call centre.

In another embodiment, the signal interface module sends the token representing the caller's credit card number directly to the agent's computer terminal 1102 shown in FIG. 11. In this way, third-party applications on the computer terminal 1102 may automate the agent's data entry task, and remove the requirement for call processor hardware 1120 to be present at the agent's computer terminal.

Following any modifications made by the signal modification module 1210, the digital audio is then converted for onward transmission in the appropriate format by the audio output module 1218.

In an embodiment, the audio output module 1218 sends the modified audio signal onward to the phone 1221 of the call centre agent. The modified audio signal is decoded as shown in FIG. 11 for automated data entry to the call centre agent's computer terminal 1102.

In another embodiment, the audio output module sends the modified audio signal as VoIP data directly to the computer terminal 1102 of the call centre agent, where a third-party application 1132 decodes the modified audio for automated data entry.

In the embodiments described above, the caller remains in conversation with the call centre agent during the transaction, but the call centre agent is unable to hear or otherwise have access to the caller's sensitive information. Information displayed on the call centre agent's computer terminal is a representation of the caller's credit card data, not the actual data itself. In this manner, the entire call centre, including its telephone system, call recording devices, databases, networks, computers and agents may be considered out of scope for PCI DSS.

Figure 14:
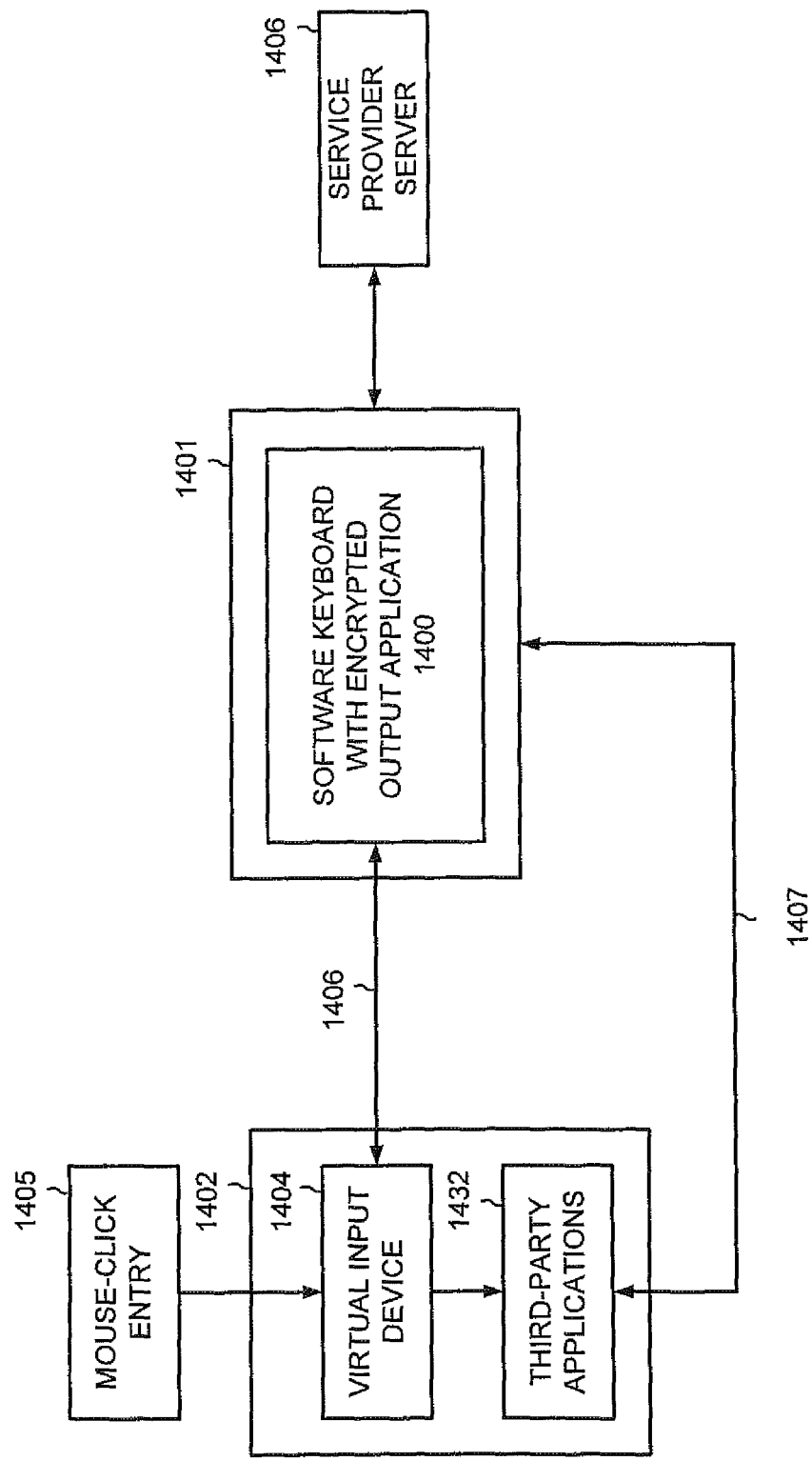

In embodiments, a virtual input device 1404 is provided to the computer terminal 1402 by the proxy server 1401, as schematically shown in FIG. 14. The virtual input device 1404 may be delivered to the computer terminal 1402 through a secure connection 1406 by modifying the webpage being served to it via the proxy server 1401. The user clicks their mouse 1405 on virtual keys to enter the card number. The information can either be protected (e.g. encrypted) at the computer terminal, or securely sent in an unprotected format to the server 1401. In either case, the input can be placed into the credit card box in the field, for example in the protected (e.g. encrypted) format or as dummy information respectively. In the latter case, the dummy information is replaced by the unprotected information sent by separate communication channel 1406 from the communication channel 1407 on which web page is sent. Thus, the input is achieved without keystrokes. In embodiments, the virtual input device 1404 can be embedded into the user's webpage or served through a secure remote connection from a stand-alone server, i.e. not the proxy server 1401.

In embodiments, the computer terminal may be a personal computer of an individual, such as a mobile phone. Thus, input devices other than a mouse input 1405 are contemplated, such as touchscreens.

Figure 15:
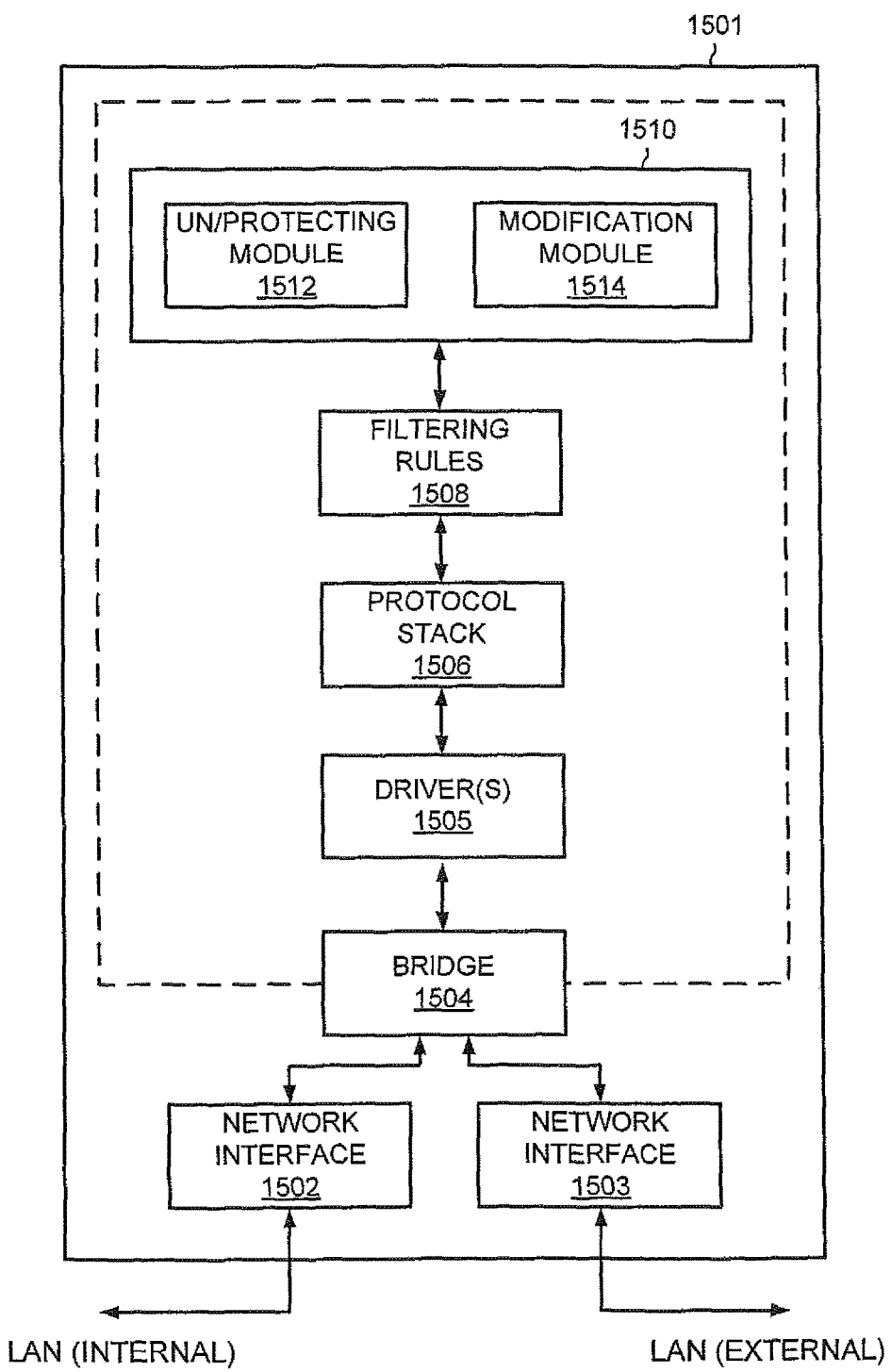
FIG. 15 schematically shows a server data processing apparatus, according to an embodiment.

FIG. 15 schematically shows a proxy server 1501, according to an embodiment. The proxy server 1501 comprises two network interfaces 1502 and 1503, connected by an internal bridge 1504. The network interface cards 1502 and 1503 allow the proxy server to interact with the network, and are associated with a driver 1505, a network protocol stack 1506 (for example, TCP/IP), filtering rules 1508 and a proxy processing engine 1510. In FIG. 15, these elements are depicted in a logical hierarchy in which network interface cards 1502 and 1503 are at the lowest logical level and the proxy processing engine 1510 is at the highest logical level. The driver 1505 is a software element executed on or in close association with network interfaces 1502 and 1503 and the bridge 1504, and is responsible for examining each packet of information that arrives from the network to determine its source, destination and the type of request or other message that it contains. The protocol stack 1506 governs which formats network messages can assume and it defines a set of rules for how to interpret their contents. The filtering rules 1508 determine how different packets are handled. When the proxy server functions as a packet filter, the network interface 1502 receives all packets from the internal network intended for the external network (e.g. the internet), and the network interface 1503 receives all packets from the external network intended for the internal network. By using filtering rules 1508 packets intended for an external service provider system, for example, are rerouted to the proxy processing engine 1510. The proxy processing engine 1510 comprises a module 1512 for unprotecting or protecting sensitive information and a module 1514 for instructing modification of the traffic. The proxy server may be implemented using a processor and memory (denoted by the dashed line) having a set of instructions to carry out the aforementioned methods. As mentioned earlier, if no additional network connectors, such as LAN cables, are attached to the packet filter, it cannot be addressed by any device. This prevents the packet filter from being accessed, modified or controlled.

It will be appreciated that in the foregoing embodiments not all of the components of the computing devices have been shown in the interests of clarity. Server computing devices may be any computing device providing one or more services to users, applications and/or other computing devices, e.g., over a network. For example, server computing device may include file servers, mail servers, web servers, public servers, etc. Client computing devices may be any computing device using, utilizing or otherwise associated with a service provided by a server. For example, client computing devices may be or may include, for example, a laptop computer, a desktop computer, or a handheld device such as a Personal Digital Assistant (PDA) device, tablet computer, or mobile phone. Computing devices may include, but are not limited to, a processing unit, a memory, and a bus that couples various components including the memory to the processing unit. The bus may be any of several types of bus structures including a memory bus or memory controller, a peripheral bus, and a local bus using any of a variety of bus architectures. The memory can include both volatile and non-volatile media, removable and non-removable media, implemented in any method or technology for storage of information such as computer readable instructions, data structures, program modules or other data. The memory can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. A user may enter commands and information through input devices such as a keyboard and pointing device, commonly referred to as a mouse, trackball or touch pad. A monitor or other type of display device may also be present.

Although in foregoing embodiments the information pertains to financial information such as credit card information, the skilled reader will appreciate that the information which is to be protected and/or unprotected can be defined differently depending on the context in which it is used. For example, it may include information that is associated with a specific person X, personal information that some party believes should be kept private, and information that identifies or can be used to identify, contact, or locate the person to whom such information pertains. Specific examples include information such as a person's national identification number (such as Social Security Number or National Insurance Number), vehicle registration plate number, driver's license number, credit card number, date of birth, and genetic information.

Although in foregoing embodiments DTMF tones in digital audio signals are detected and modified, the signal data may comprise VoIP data packets. In the case of VoIP, DTMF "tones" are transmitted in specific packets (RFC 2833 RTP Event packets).

Although in foregoing embodiments the predetermined patterns are described as comprising audio tones such as DTMF tones, other kinds of predetermined patterns can also be detected, for example voice signals that contain voice biometric information, information representing a spoken word or phrase, or spoken security information (such as a password, pass phrase, or other security information).

The signals communicated by the signal interface module may be with the operating system of a data processing apparatus (a computer). The signals communicated by the signal interface may be with the operating system of a telephone or other portable communication device. The signals communicated by the signal interface may be communicated via an intermediate method (such as via text files, XML files, or Really Simple Syndication (RSS)). In these ways, many different third-party applications can be communicated with via the signal interface, according to communications format standards familiar to those skilled in the art.

In embodiments, modifying a message may include altering a web page's HTML content or document object model, macros or scripts, or any similar or related communication required to interact with the third-party application. The modified message may act so that protected information for the third-party application is made automatically to only an expected data entry location. For example, the modified message can include the function of locating a data entry field with a particular property or characteristic (for example one which has a text label 'CVV' on its left) and then passing the CVV element of the card data only to this field. In this way, card data is forced into its intended location.

The third-party application may be a web page being displayed within a computer operating system. It may also be an application running within a computer operating system. The third-party application may be a web page being displayed on a telecommunications device, including a mobile phone. It may also be an application running within a telecommunications device, including a mobile phone. It may also be a database or other data storage medium. Thus commonly-used data entry interfaces (such as computer applications or websites) can have sensitive data inserted in a protected format.

While the described methods and apparatus can provide particular advantages to call centre operations, they are also applicable to other communication technologies that process sensitive information. In this regard, although in foregoing embodiments reference is made to service provide servers and computer terminals of call centres, these may comprise other computing devices.

In the foregoing detailed description of embodiments, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Although the present invention has been described hereinabove with reference to specific embodiments, it will be apparent to a skilled person in the art that modifications lie within the spirit and scope of the appended claims.

The invention claimed is:

1. A system comprising:
an apparatus for mediating communications between a first computing device and a second computing device, the apparatus comprising:
means for establishing a communications link to each of the first and second computing devices;
means for receiving a first message from the first computing device, the content of the first message comprising information in a protected format;
means for converting at least part of the information in the protected format to an unprotected format; and
means for transmitting a second message to the second computing device, the content of the second message comprising at least part of the information in the unprotected format; and
at least one of:
(1) an apparatus for processing information, the apparatus comprising:
a computer terminal;
a peripheral device coupled to the computer terminal;
wherein the peripheral device comprises:
means for receiving information in an unprotected format, at least part of the information intended for a destination computing device,
means for converting the information into a protected format, and
means for outputting the information in the protected format to an application that is running on the computer terminal; and
wherein the computer terminal comprises:
means for establishing a communications link to an intermediary computing device, and
means for transmitting a message to the intermediary computing device, the message comprising at least part of the information in the protected format to an intermediary computing device;
wherein the intermediary computing device is operable to convert the protected format to an unprotected format and to transmit at least part of the information in the unprotected format to the destination computing device; and
(2) an audio modifier for processing signals of a telephonic communication, the signals conveying sensitive and non-sensitive information, the sensitive information being for use in a transaction occurring between a first computing device and a second computing device via an intermediary computing device, the apparatus comprising:
means for receiving the signals;
means for monitoring the received signals to detect, in the signals, one or more instances of one or more predetermined characteristics that represent the sensitive information;
means for determining an alphanumeric representation for each identified instance of the predetermined characteristics, the determined alphanumeric representations being in an unprotected format;
means for processing the alphanumeric representations to obtain the alphanumeric representations in a protected format;
means for outputting the alphanumeric representations in the unprotected format to the intermediary computing device; and
means for outputting the alphanumeric representation in the protected format to the first computing device and the intermediary computing device.

2. A system comprising:
an apparatus for mediating communications between a first computing device and a second computing device, the apparatus comprising:
means for receiving a first message from the second computing device, the content of the first message comprising information in an unprotected format;
means for converting the information in the unprotected format to a protected format;
means for establishing a communications link to the first computing device; and
means for transmitting a second message to the first computing device, the content of the second message comprising at least part of the information in the protected format; and
at least one of:
(1) an apparatus for processing information, the apparatus comprising:
a computer terminal;
a peripheral device coupled to the computer terminal;

wherein the peripheral device comprises:
   means for receiving information in an unprotected format, at least part of the information intended for a destination computing device,
   means for converting the information into a protected format, and
   means for outputting the information in the protected format to an application that is running on the computer terminal; and
wherein the computer terminal comprises:
   means for establishing a communications link to an intermediary computing device, and
   means for transmitting a message to the intermediary computing device, the message comprising at least part of the information in the protected format to an intermediary computing device;
wherein the intermediary computing device is operable to convert the protected format to an unprotected format and to transmit at least part of the information in the unprotected format to the destination computing device; and (2) an audio modifier for processing signals of a telephonic communication, the signals conveying sensitive and non-sensitive information, the sensitive information being for use in a transaction occurring between a first computing device and a second computing device via an intermediary computing device, the apparatus comprising:

means for receiving the signals;

means for monitoring the received signals to detect, in the signals, one or more instances of one or more predetermined characteristics that represent the sensitive information;

means for determining an alphanumeric representation for each identified instance of the predetermined characteristics, the determined alphanumeric representations being in an unprotected format;

means for processing the alphanumeric representations to obtain the alphanumeric representations in a protected format;

means for outputting the alphanumeric representations in the unprotected format to the intermediary computing device; and means for outputting the alphanumeric representation in the protected format to the first computing device and the intermediary computing device.

* * * * *